(12) United States Patent
Gal et al.

(10) Patent No.: US 10,503,413 B1
(45) Date of Patent: Dec. 10, 2019

(54) METHODS AND APPARATUS FOR SAN HAVING LOCAL SERVER STORAGE INCLUDING SSD BLOCK-BASED STORAGE

(71) Applicant: EMC IP Holding Company LLC, Hopkinton, MA (US)

(72) Inventors: Yochai Gal, Herzliya (IL); Niko Farhi, Petah-Tikva (IL); Nir Sela, Kochav Yair (IL); Yaniv Kaul, Raanana (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 230 days.

(21) Appl. No.: 15/393,337

(22) Filed: Dec. 29, 2016

Related U.S. Application Data

(60) Provisional application No. 62/344,057, filed on Jun. 1, 2016.

(51) Int. Cl.
  *G06F 3/06* (2006.01)
(52) U.S. Cl.
  CPC ......... *G06F 3/0619* (2013.01); *G06F 3/067* (2013.01); *G06F 3/0665* (2013.01); *G06F 3/0689* (2013.01)
(58) Field of Classification Search
  None
  See application file for complete search history.

(56) References Cited

U.S. PATENT DOCUMENTS

| | | | |
|---|---|---|---|
| 5,528,156 A | 6/1996 | Ueda et al. | |
| 6,249,755 B1 | 6/2001 | Yemini et al. | |
| 6,493,804 B1 | 12/2002 | Soltis et al. | |
| 7,065,467 B1 | 6/2006 | Ohsie et al. | |
| 7,107,185 B1 | 9/2006 | Yemini et al. | |
| 7,337,090 B1 | 2/2008 | Yemini et al. | |
| 8,443,153 B1 * | 5/2013 | Edwards | G06F 17/30091 711/147 |
| 8,732,518 B2 * | 5/2014 | Storer | G06F 11/008 714/6.1 |
| 8,793,283 B1 | 7/2014 | Austern et al. | |
| 8,819,078 B2 | 8/2014 | Roy et al. | |

(Continued)

FOREIGN PATENT DOCUMENTS

WO    WO 2012/150375    11/2012

OTHER PUBLICATIONS

U.S. Non-Final Office Action dated Jul. 12, 2017 for U.S. Appl. No. 14/674,134; 23 Pages.

(Continued)

*Primary Examiner* — Michael Alsip
(74) *Attorney, Agent, or Firm* — Daly, Crowley, Mofford & Durkee, LLP

(57) ABSTRACT

Methods and apparatus for a system including a storage array with solid state drive (SSD) storage and a controller coupled to the SSD storage. The controller may include a data system to perform input/output operations to the SSD storage, a control system coupled to the data system to control an address to hash value mapping, a routing system coupled to the control system to process commands from remote hosts, segment data into data blocks, and generate the hash values for the data blocks, and a data server associated with the routing system to receive read and write commands from a data client running on a remote host, wherein the storage array contributes a portion of the SSD storage to storage pools of a distributed elastic storage system.

17 Claims, 22 Drawing Sheets

(56) References Cited

U.S. PATENT DOCUMENTS

| | | | |
|---|---|---|---|
| 8,832,035 B2* | 9/2014 | Raj | G06F 3/0608 707/664 |
| 9,053,000 B1 | 6/2015 | Lam et al. | |
| 10,013,182 B2* | 7/2018 | Dain | G06F 3/0641 |
| 2008/0133187 A1 | 6/2008 | Smith | |
| 2009/0047677 A1 | 2/2009 | Frasch et al. | |
| 2010/0082900 A1* | 4/2010 | Murayama | G06F 3/0608 711/114 |
| 2011/0296361 A1 | 12/2011 | Tanaka | |
| 2012/0005435 A1* | 1/2012 | Emaru | G06F 3/0608 711/154 |
| 2012/0221314 A1 | 8/2012 | Bourlatchkov et al. | |
| 2012/0297061 A1 | 11/2012 | Pedigo et al. | |
| 2013/0166724 A1 | 6/2013 | Bairavasundaram et al. | |
| 2013/0297869 A1 | 11/2013 | Mills et al. | |
| 2014/0195847 A1 | 7/2014 | Webman et al. | |
| 2014/0344230 A1 | 11/2014 | Krause et al. | |

OTHER PUBLICATIONS

U.S. Appl. No. 14/674,134, filed Mar. 31, 2015, Ohsie et al.
U.S. Appl. No. 13/435,017, filed Mar. 30, 2012, He et al.
U.S. Appl. No. 13/536,512, filed Jun. 28, 2012, Zhang et al.
U.S. Appl. No. 13/536,726, filed Jun. 28, 2012, Lam et al.
U.S. Appl. No. 14/674,087, filed Mar. 31, 2015, Ohsie et al.
U.S. Appl. No. 14/674,128, filed Mar. 31, 2015, Ohsie et al.
Coleman et al., "Best Practices for Deploying VMware vCloud Director on Vblock Infrastructure Platforms;" The Virtual Computing Environment Company, www.vce.com; Sep. 2011; 20 pages.
Cisco Unified Computing System and EMC VNXe3300 Unified Storage System; White Paper; Jan. 2011; Revision 1.0; $EMC^2$; Cisco Systems, Inc.; 170 West Tasman Drive, San Jose, CA 95134-1706, www.cisco.com; 9 pages.
EMC Compute-As-A-Service—Design Principles and Considerations for Deployment; VCE Vblock; VMware vCloud Director; EMC Solutions Group; Dec. 2011; EMC White Paper; 58 pages.
EMC Integrated Infrastructure for VMware Enabled by EMC VNXe3100 and VMware vSphere 4.1; An Architectural Overview; White Paper; EMC Global Solutions; $EMC^2$; Feb. 2011; 24 pages.
EMC Scaleio Architectural and Functional Overview; Dec. 2013; EMC White Paper; 13 pages.
Malewicz et al.; "Pregel: A System for Large-Scale Graph Processing"; SIGMOD'10; Jun. 6-11, 2010; Indianapolis, Indiana; pp. 135-145; 11 pages. ACM 978-1-4503-0032-2/10/06.
Service Catalog Strategies for Vblock™ Infrastructure Platforms, IaaS COE; Jan. 2011; The Virtual Computing Environment Company, www.vce.com; 19 pages.
Unified Infrastructure Manager/Provisioning; © 2011 VCE Company; The Virtual Computing Environment Company, www.vce.com; 3 pages.
Vblock Infrastructure Platforms Series 300 Architecture Overview; Version 2.4; Aug. 2011; The Virtual Computing Environment Company, www.vce.com; 74 pages.
Vblock Infrastructure Platforms 2010 Vblock Platforms Architecture Overview; Version 1.3; Nov. 2011; The Virtual Computing Environment Company, www.vce.com; 25 pages.
Vblock Infrastructure Platforms Technical Overview; © 2011 VCE Company; The Virtual Computing Environment Company, www.vce.com; 8 pages.
Vblock Solution for Trusted Multi-Tenancy: Technical Overview; Aug. 2011; The Virtual Computing Environment Company, www.vce.com; 76 pages.
VMware vStorage APIs for Array Integration with EMC VNX Series for NAS; Benefits of EMC VNX for File Integration with VMware VAAI; White Paper; EMC Solutions Group; Jan. 2012; EMC2;17 pages.
Ohsie; "Modeled Abductive Inference for Event Management and Correlation" Thesis; for Columbia University; Jan. 1998; 254 pages.
U.S. Appl. No. 14/674,134, Non-Final Office Action dated Jan. 16, 2018, 19 pages.
Notice of Allowance dated Sep. 5, 2018 for U.S. Appl. No. 14/674,134; 11 Pages.
Response to Office Action dated Jan. 16, 2018 for U.S. Appl. No. 14/674,134 as filed on Jul. 13, 2018; 18 Pages.
Response to U.S. Non-Final Office Action dated Jul. 12, 2017 for U.S. Appl. No. 14/674,134; Response filed Nov. 13, 2017; 19 Pages.

* cited by examiner

US 10,503,413 B1

METHODS AND APPARATUS FOR SAN HAVING LOCAL SERVER STORAGE INCLUDING SSD BLOCK-BASED STORAGE

CROSS REFERENCE TO RELATED APPLICATIONS

The present application claims the benefit of U.S. Provisional Patent Application No. 62/344,057, filed on Jun. 1, 2016, which is incorporated herein by reference.

BACKGROUND

Computer data storage is vital to many organizations. There are a variety of types of systems that can be used to store data and protect data against disasters. Different types of data storage systems may have different storage, performance, cost characteristics, etc. Example parameters can include latency, storage efficiency, snapshot capability, elasticity, node mixing, scalability, storage device type and cost, and the like. It can be challenging for organizations to select an appropriate data storage system based upon the needs and resources of the organization.

SUMMARY

Example embodiments relate to a server-based SAN having local application server storage that includes at least some block-based solid state drive storage on a remote storage array. Data servers can have local storage contributing to storage pools for the system. Data clients can have block device drivers that expose shared volumes to applications that can run on the same server as the data client. The data servers can perform the I/O operations requested by the remote data clients. In embodiments, a data server can run on a solid state drive (SSD) storage array that can provide a data efficient storage pool for the system. SSD storage arrays can form storage pools with no mirroring required where a storage array cluster provides data protection. In embodiments, a system can non disruptively move volumes from one solid state cluster to another solid state cluster by temporarily establishing mirroring between solid state clusters, copying the data, and de-committing the moved LUN's space. In embodiments, a data server can be embedded within a routing system of a solid state storage cluster to present storage volumes to data clients in the system.

In embodiments, a system may include: a storage array comprising: solid state drive (SSD) storage; a controller coupled to the SSD storage, the controller comprising: a data system to perform input/output operations to the SSD storage with a data block hash value to physical address mapping; a control system coupled to the data system to control an address to hash value mapping; a routing system coupled to the control system to process commands from remote hosts, segment data into data blocks, and generate the hash values for the data blocks; and a data server associated with the routing system to receive read and write commands from a data client running on a remote host, wherein the storage array contributes a portion of the SSD storage to storage pools of a distributed elastic storage system.

In other embodiments, a method may comprise: coupling a controller to solid state drive (SSD) storage of a storage array, wherein the controller includes a data system to perform input/output operations to the SSD storage with a data block hash value to physical address mapping; coupling a control system to the data system to control an address to hash value mapping; coupling a routing system to the control system to process commands from remote hosts, segment data into data blocks, and generate the hash values for the data blocks; and associating a data server with the routing system to receive read and write commands from a data client running on a remote host, wherein the storage array contributes a portion of the SSD storage to storage pools of a distributed elastic storage system.

In other embodiments, an article may comprise: a non-transitory computer readable medium having stored instructions that enable a machine to: control a controller coupled to solid state drive (SSD) storage of a storage array, wherein the controller includes a data system to perform input/output operations to the SSD storage with a data block hash value to physical address mapping; communicate with a control system coupled to the data system to control an address to hash value mapping; communicate with a routing system coupled to the control system to process commands from remote hosts, segment data into data blocks, and generate the hash values for the data blocks; and associate a data server with the routing system to receive read and write commands from a data client running on a remote host, wherein the storage array contributes a portion of the SSD storage to storage pools of a distributed elastic storage system.

BRIEF DESCRIPTION OF THE DRAWINGS

The foregoing features of this invention, as well as the invention itself, may be more fully understood from the following description of the drawings in which.

DETAILED DESCRIPTION

Figure 1:
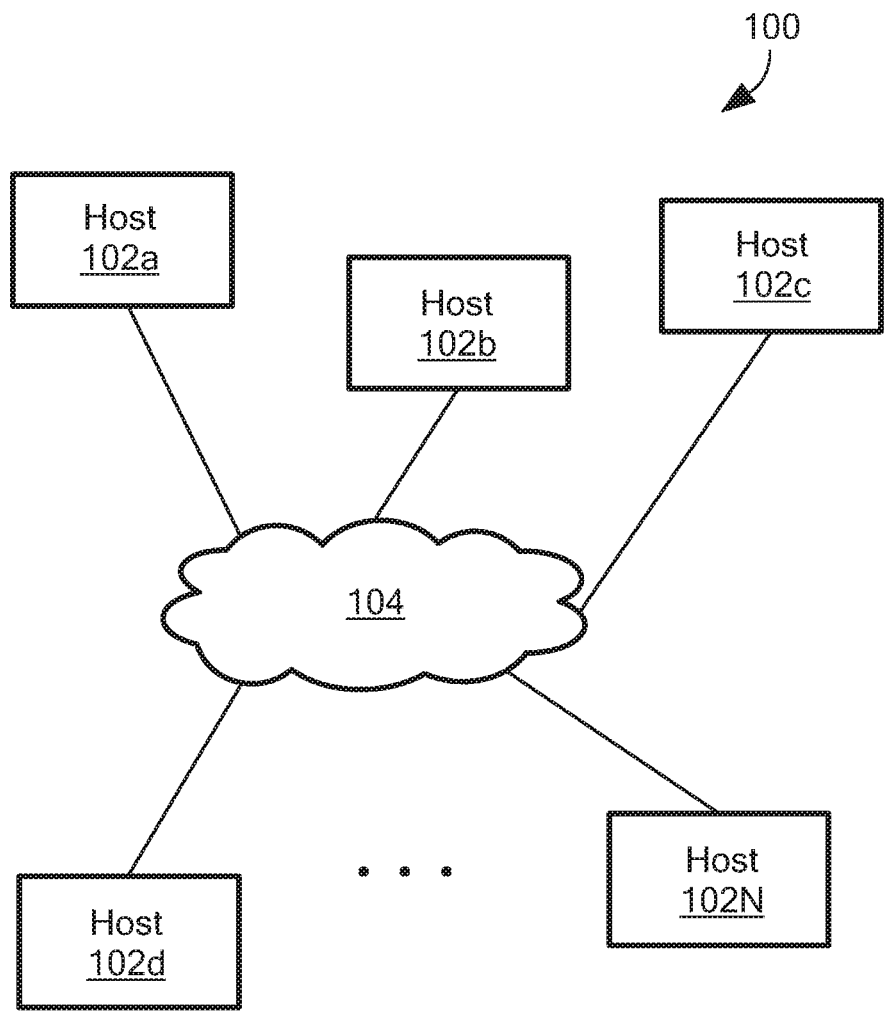
FIG. 1 is a schematic representation of a system according to an example embodiment of the invention.

FIG. 1 shows an example system that may have distributed data clients and data servers including a data server embedded in a solid state drive (SSD) storage array. The system 100 can include a series of hosts 102*a*-N coupled to each other via a network 104. The hosts 102 may have storage that can be shared with other hosts. The hosts can run various applications including databases, hypervisors, etc.

Figure 2A:
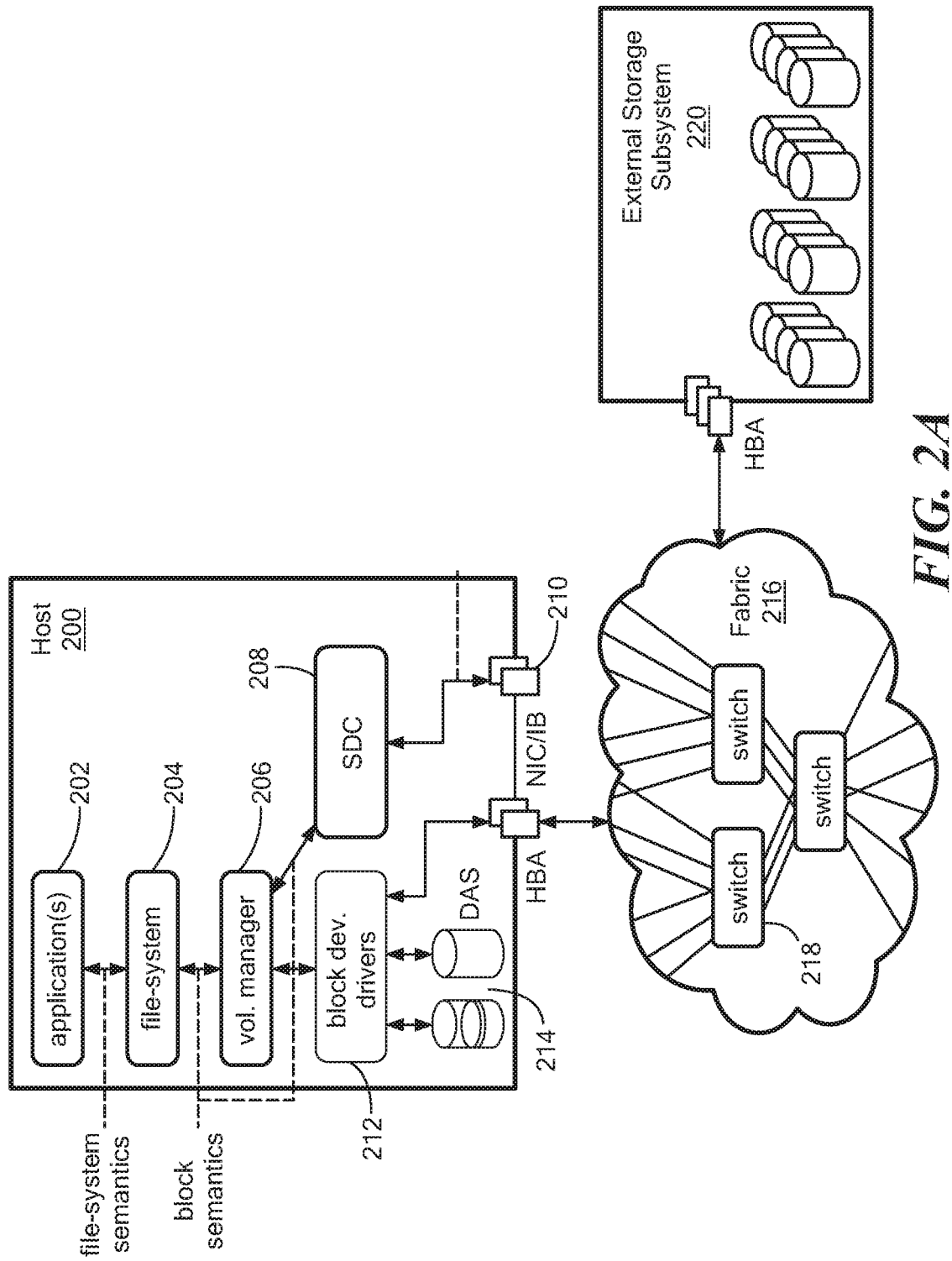
FIG. 2A is a schematic diagram of a system having elastic storage according to an example embodiment of the invention.

FIG. 2A shows an illustrative host 200 that can include an application 202, file system 204, and volume manager 206 coupled together in accordance with example embodiments of the disclosure. The host 200 can further include an elastic storage data client 208 coupled to the volume manager 206 and to a NIC/IB interface 210. The host 200 can further include block device drivers 212 and direct-attached storage (DAS) 214. The host 200 can be coupled to a switch fabric 216 having any practical number of switches 218. An external storage system 220 can also be coupled to the fabric 216. At least some of the storage can be provided by a solid state drive storage array having a data server in example embodiments.

Figure 2B:
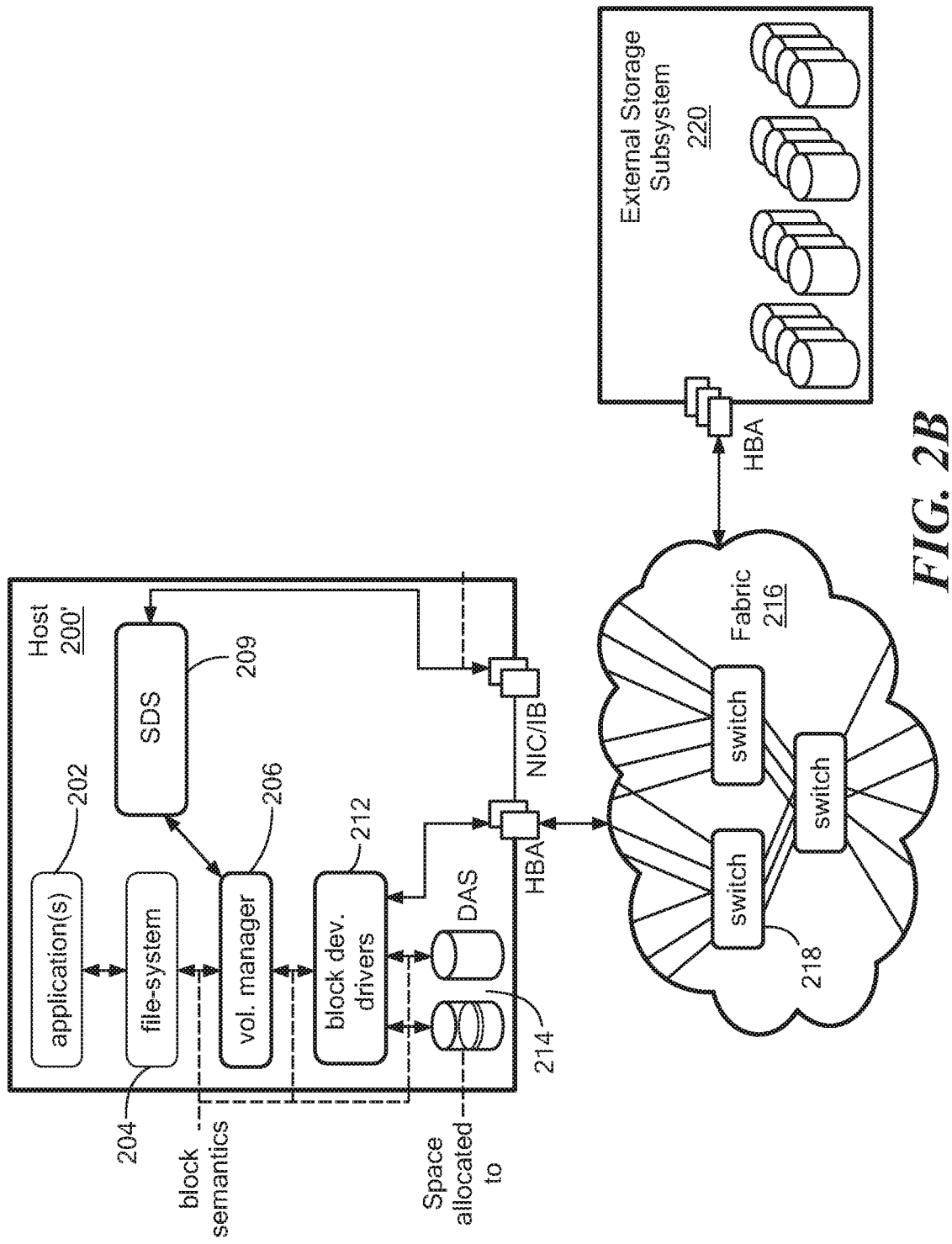
FIG. 2B is a schematic diagram of a system having elastic storage according to an example embodiment of the invention.

FIG. 2B shows a host 200' that can have some commonality with host 200 of FIG. 2A and may include an elastic storage data server 209, which 'owns' local storage 214 that can contribute to storage pools for the elastic storage in accordance with example embodiments of the disclosure. In one embodiment, the elastic storage data server 209 is provided as a daemon/service. It is understood that the local storage 214 can be provided as dedicated disks, partitions within disks, files, etc. At least some of the storage can be provided by a solid state drive storage array having a data server in example embodiments.

Figure 2C:
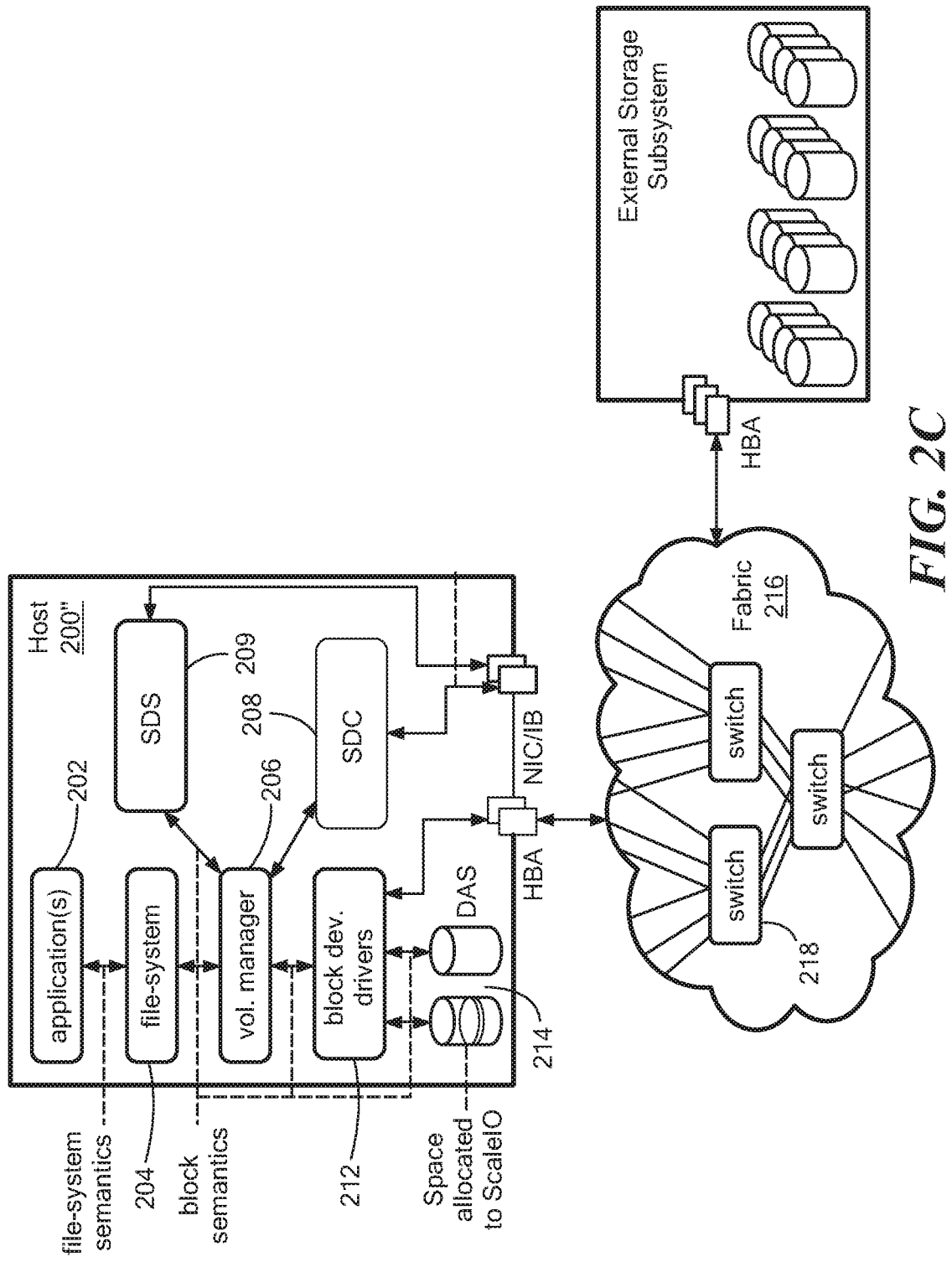
FIG. 2C is a schematic diagram of a system having elastic storage according to an example embodiment of the invention.

FIG. 2C shows a host 200" that may have an elastic storage data client 208, which serves the IO requests of the host applications, and an elastic storage data server 209, which serves the IO requests of the various remote elastic data clients in accordance with example embodiments of the disclosure. At least some of the storage can be provided by a solid state drive storage array having a data server in example embodiments.

Figure 3A:
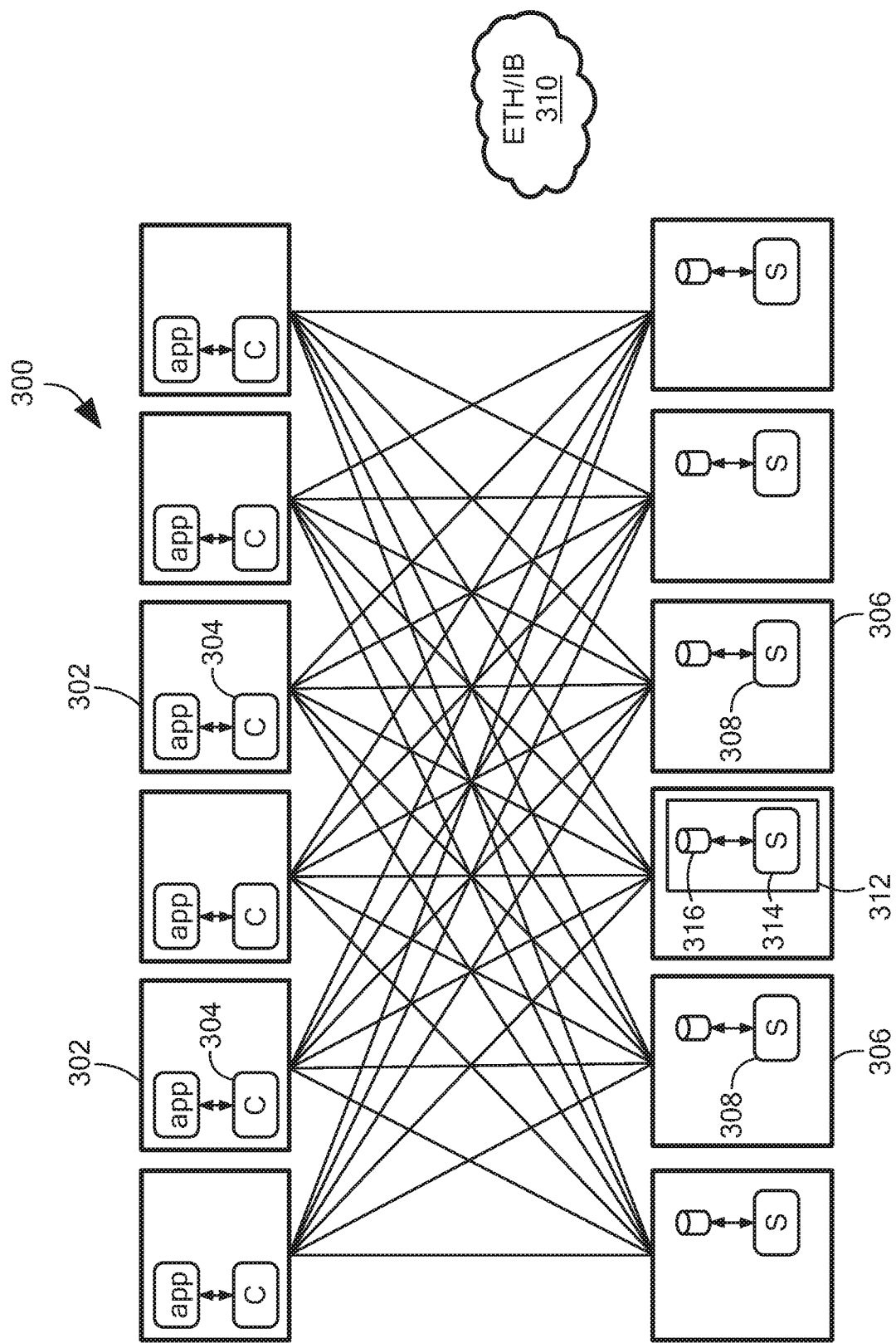
FIG. 3A is a schematic representation of a system having hosts in a two layer configuration according to an example embodiment of the invention.

FIG. 3A shows an illustrative system 300 that can have a two-layer configuration with hosts 302 having elastic storage data clients 304 coupled to hosts 306 having elastic storage data servers 308 to provide parallelism in accordance with example embodiments of the disclosure. The storage data clients 304 may contact the relevant storage data servers 308 directly via the fabric 310. It is understood that a mixture of hosts having data clients and servers and both can be coupled. It is further understood that the storage be asymmetric, e.g., different number spindles, etc.

In embodiments, the system 300 can include at least one solid state storage array 312 having an embedded data server 314 coupled to local solid state drives (SSDs) 316, for example. An example solid state storage array 312 is discussed more fully below.

Figure 3B:
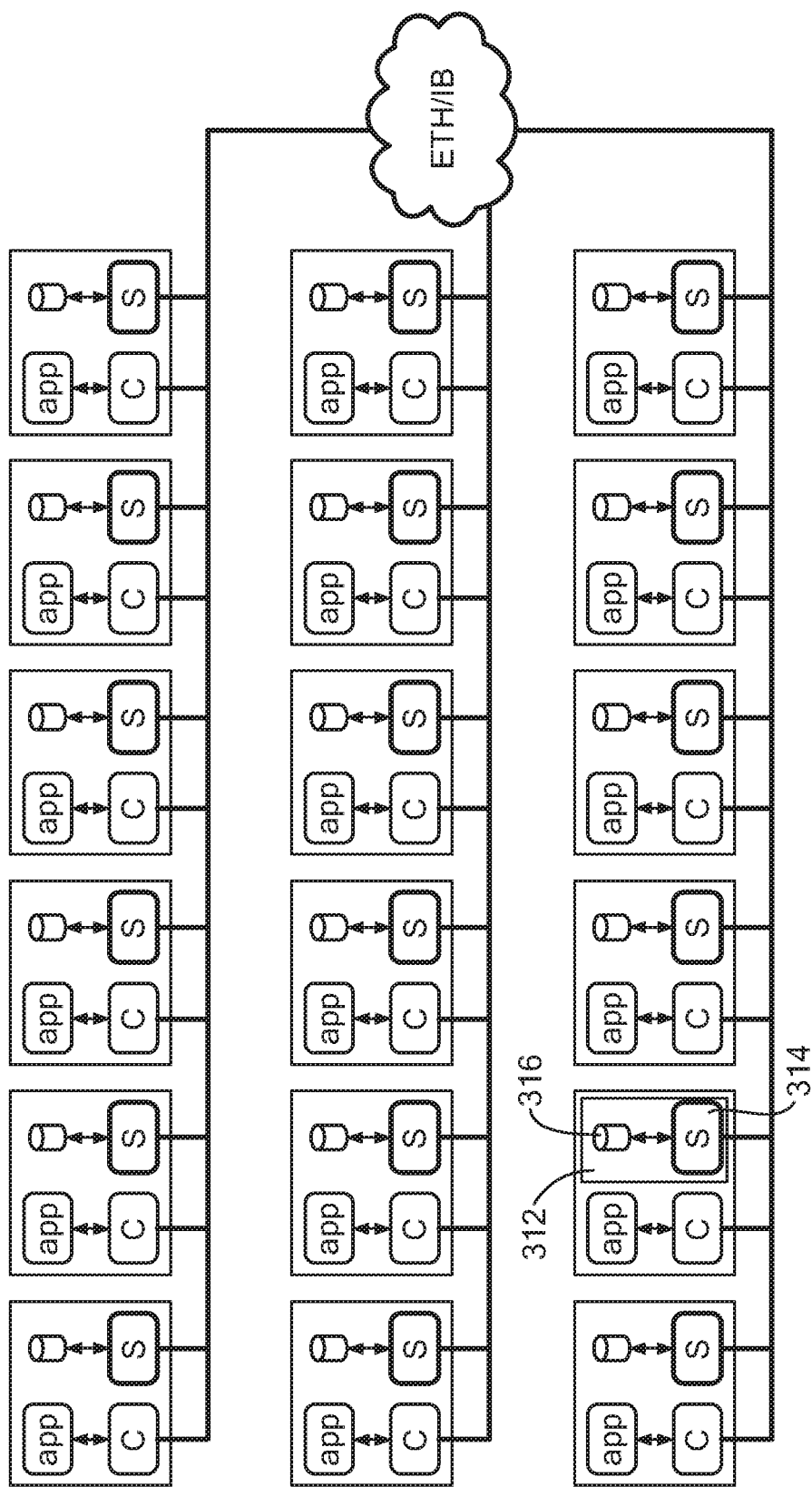
FIG. 3B is a schematic representation of a system having hosts connected in parallel according to an example embodiment of the invention.

FIG. 3B shows a system of hosts with converged network layout and configuration in which data clients and servers can be provided on the same host. The system can include at least one solid state storage array 312 having an embedded data server 314 coupled to solid state drives (SSDs) 316, for example. An example solid state storage array 312 is discussed more fully below.

Figure 4:
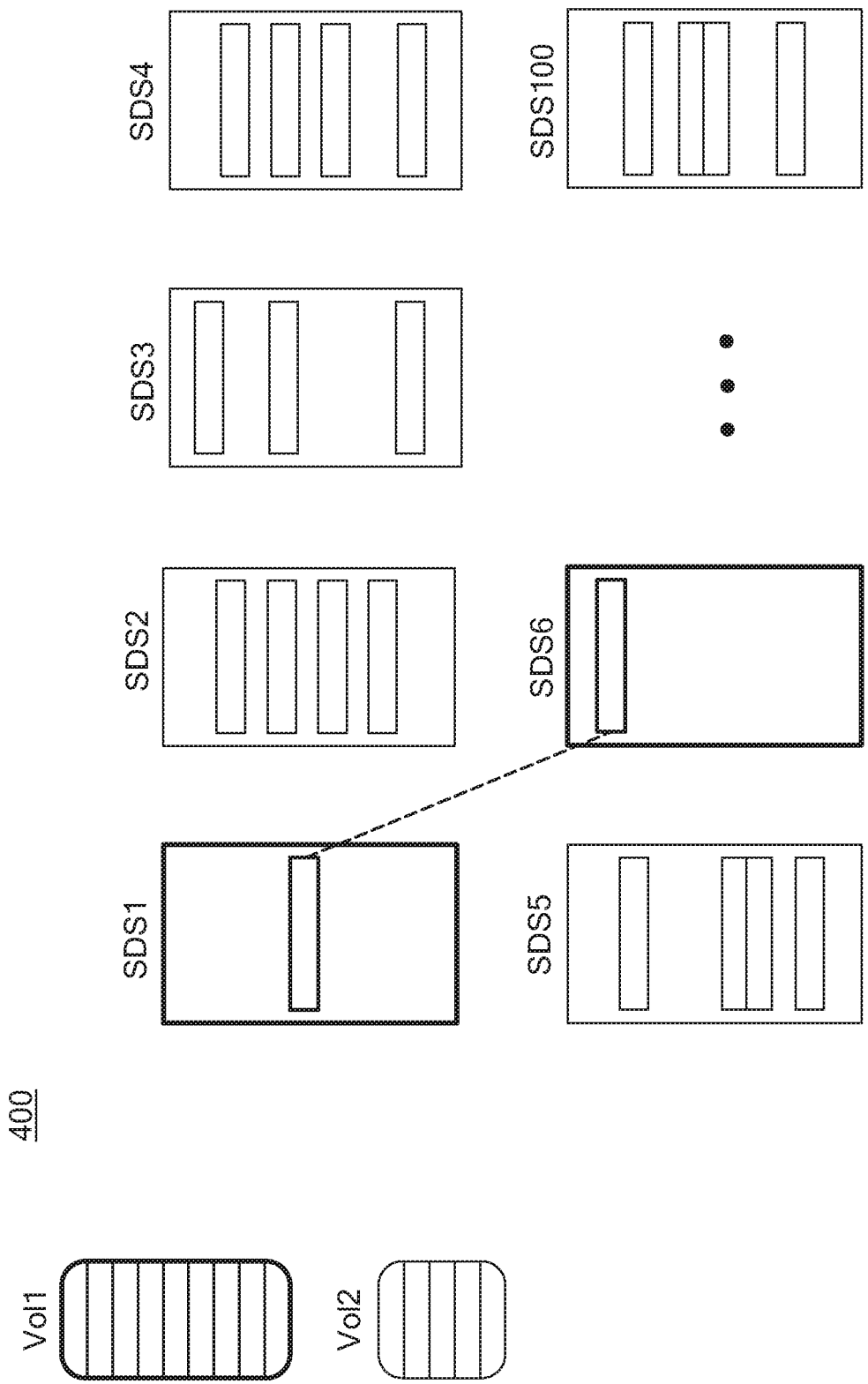
FIG. 4 is a schematic representation of a system having elastic storage with mirroring according to an example embodiment of the invention.
Figure 4A:
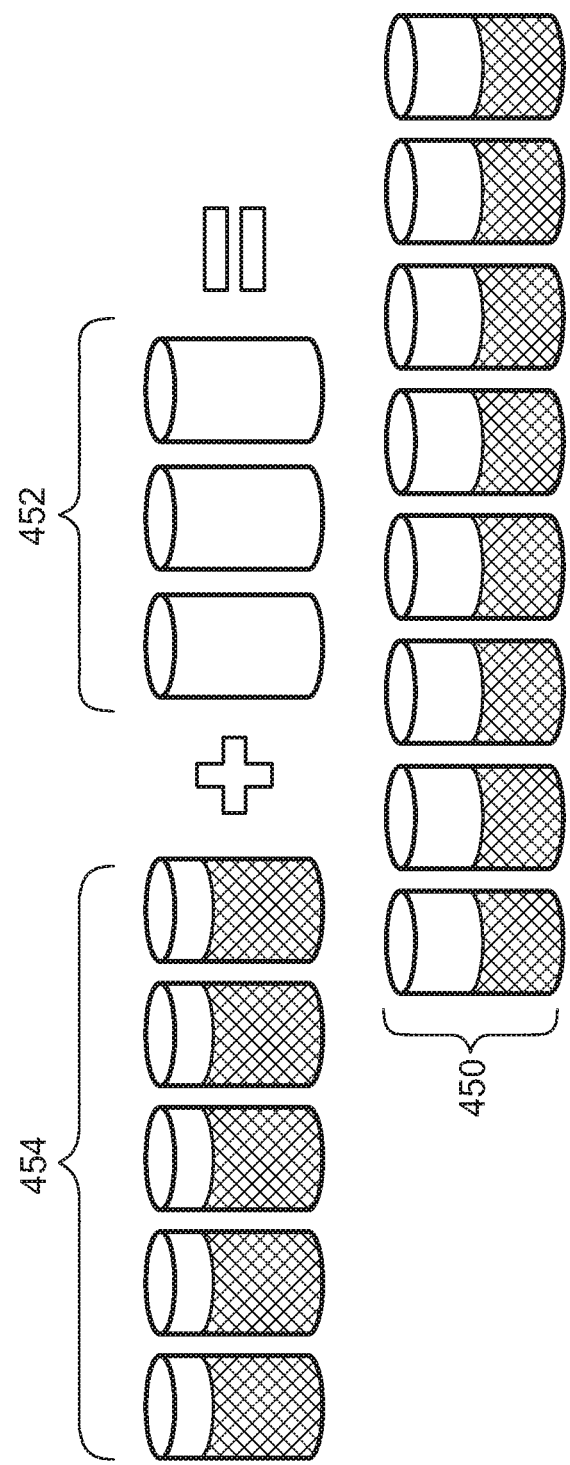
FIG. 4A is a schematic representation of adding storage and rebalancing stored data according to an example embodiment of the invention.

FIG. 4 shows an illustrative volume layout 400 for various servers and clients. As can be seen, volume 1 and volume 2 may be spread out across a cluster of storage data servers SDS1-SDS100 in a balanced manner to minimize hot spots and IO splitting. It is understood that data mirroring, which can be distributed throughout the cluster, can be provided for redundancy to prevent data to loss from disk failure. In embodiments, hosts and disks can be added and removed dynamically and that rebalancing can be performed, such as in a many-to-many manner. At least a portion of the storage can be provided by a solid state storage array. FIG. 4A shows an illustrative rebalancing of data 450 when additional storage 452 is provided to existing storage 454. At least part of the additional storage 452 and/or existing storage 454 can be provided by a solid state drive storage array.

Figure 5:
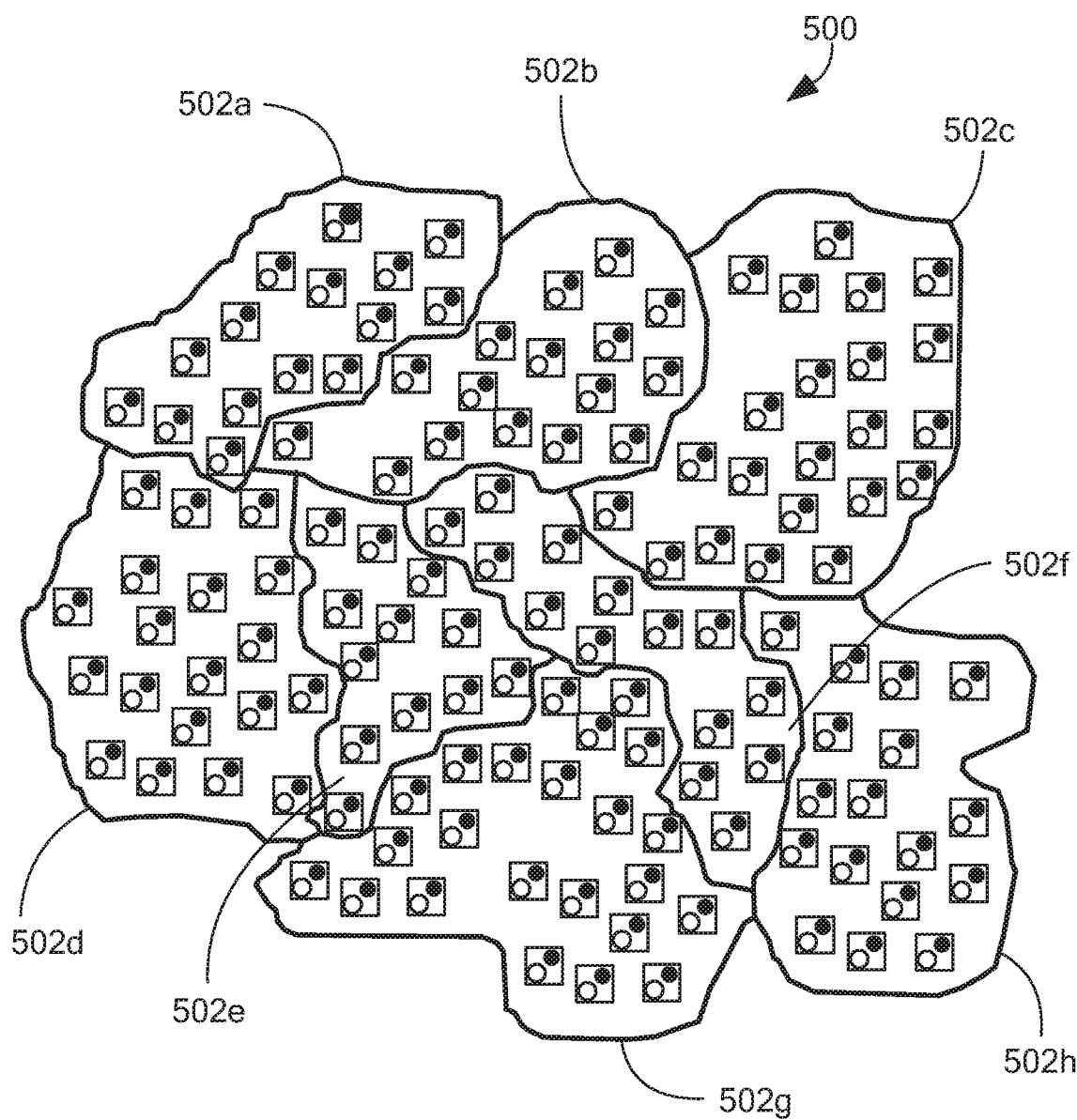
FIG. 5 is a schematic representation of a system having protection domains according to an example embodiment of the invention.

FIG. 5 shows a datacenter environment 500 having hosts with elastic storage clients and/or servers grouped in protection zones or domains 502*a-h* of elastic data servers. In embodiments, a given volume is defined in a given protection domain. Clients in a first domain can access data in a second domain. In embodiments, a data server resides in one particular protection domain.

In general, resources can be moved from one protection zone to another without disruption. At least a portion of storage can be provided by a solid state storage array in example embodiments.

Figure 5A:
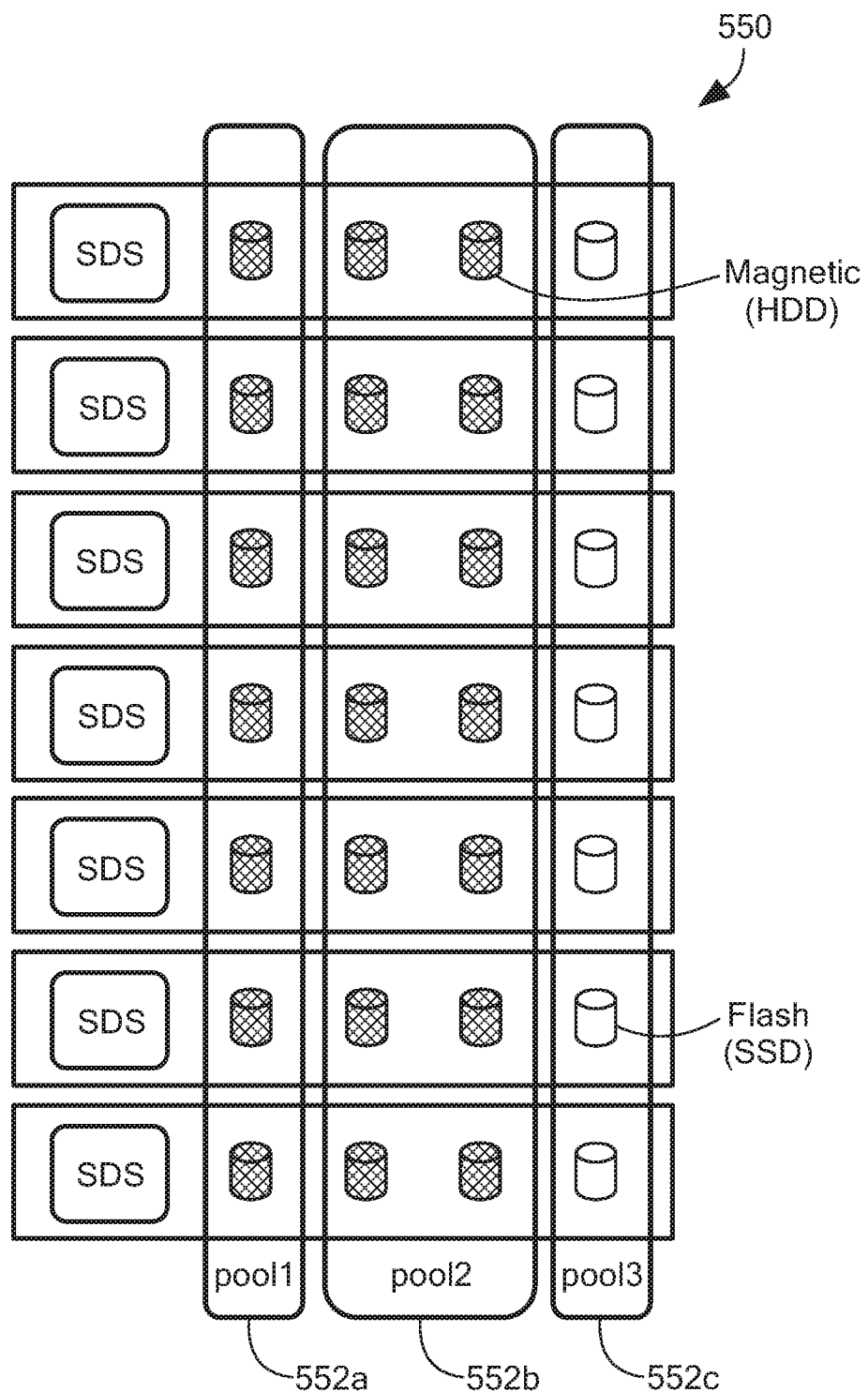
FIG. 5A is a schematic representation of a storage pools in a system having elastic storage according to an example embodiment of the invention.

FIG. 5A shows illustrative protection zone 550 having storage pools 552*a-c* formed from storage of the data servers 554. First storage pool 552*a* can be provided as directed attached storage, second storage pool 552*b* can be provided as magnetic (HDD), and third storage pool can be provided as flash (SDD) 552*c*. For performance isolation, multiple storage pools can have the same media speed. In an asymmetric configuration, storage pools can have different numbers of spindles per data server, etc. It is understood that any practical number of storage pools can be formed.

Figure 6:
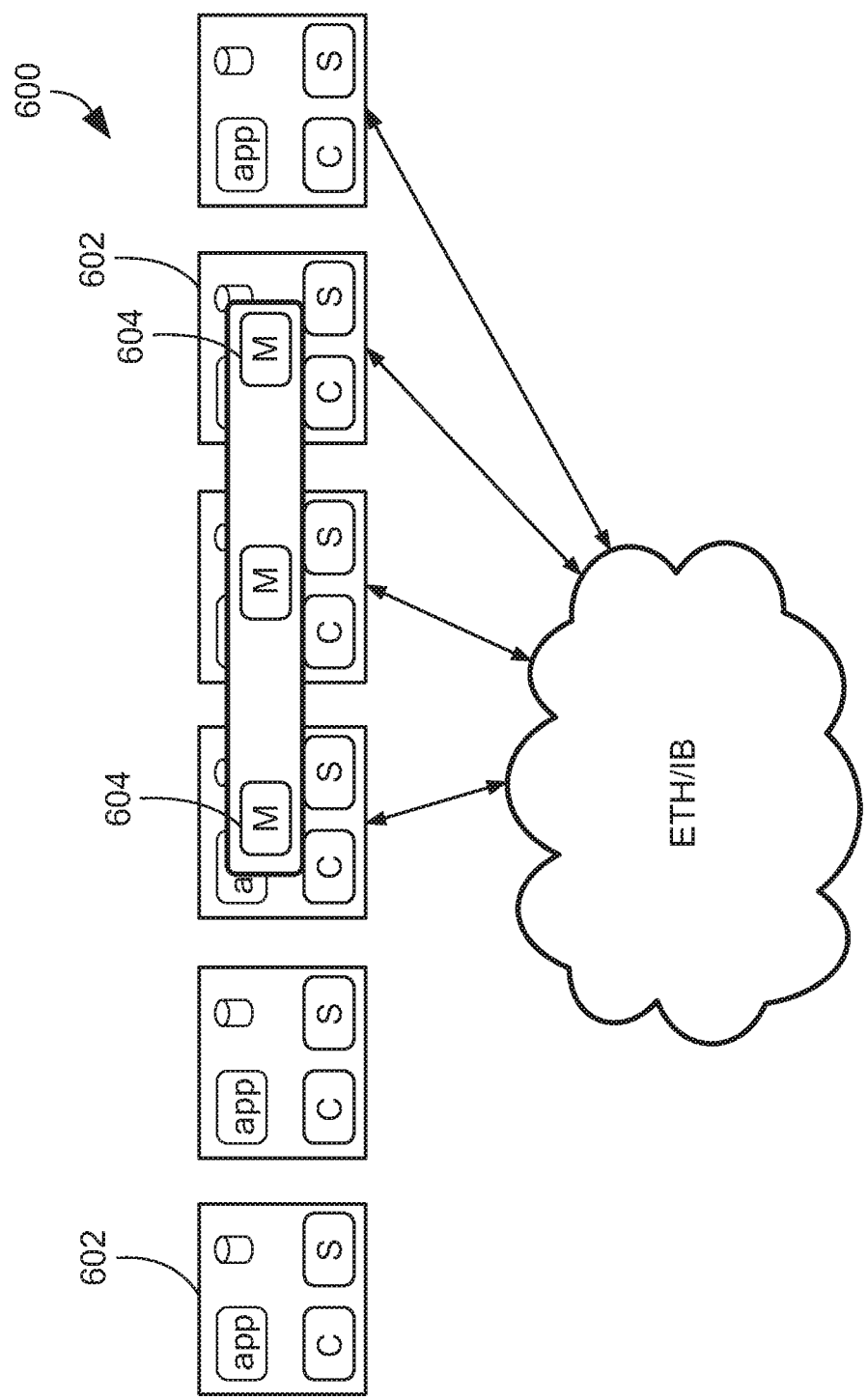
FIG. 6 is a schematic representation of a system having metadata managers according to an example embodiment of the invention.

FIG. 6 shows a system 600 in which some of the hosts 602 may include a metadata manager 604 to enable nodes to know which nodes may need to communicate. The metadata managers 604 may store mapping and storage ownership information and enabling remapping of storage and storage migration, for example. In embodiments, user data does not pass through the metadata managers 604.

Figure 7:
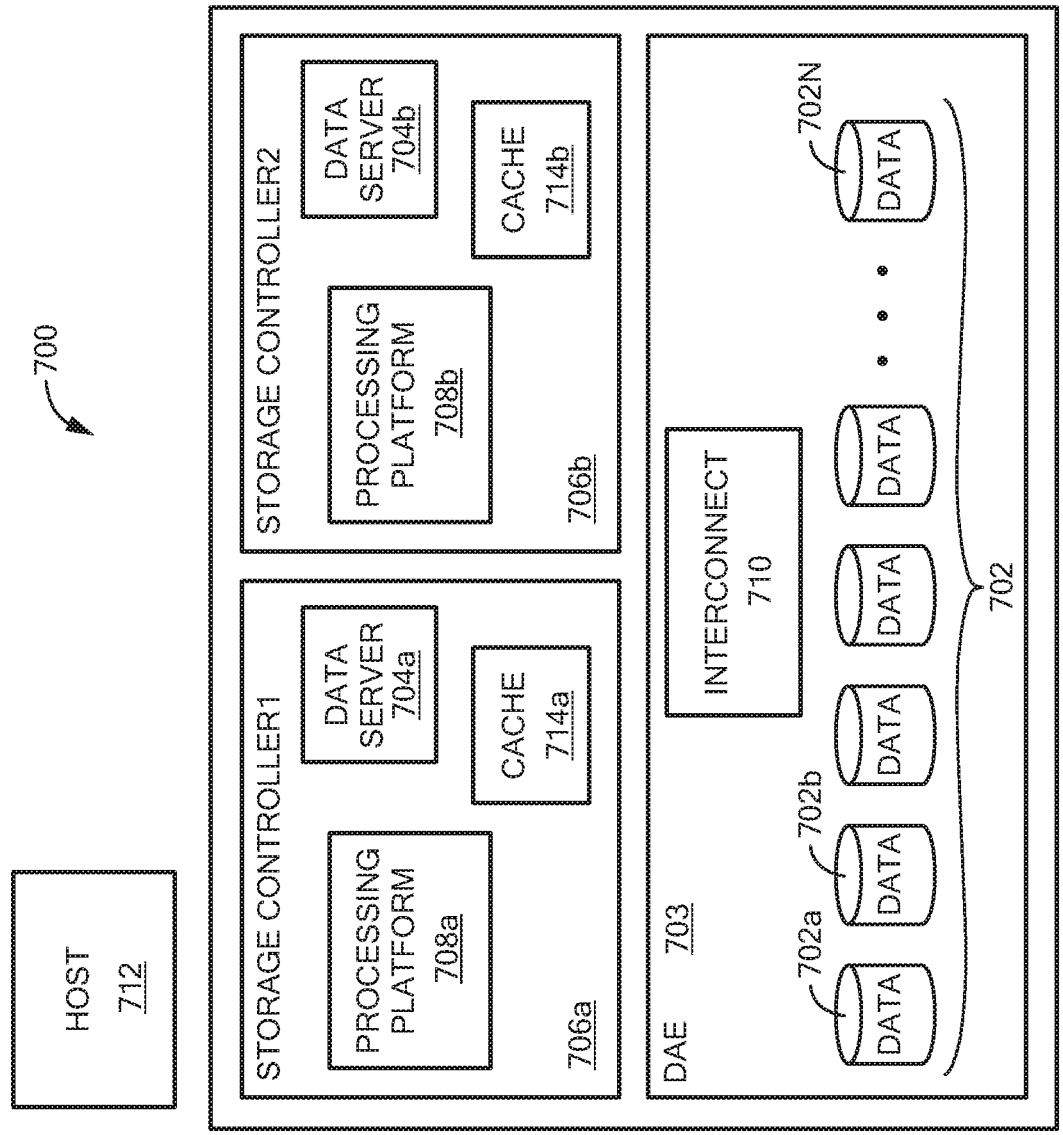
FIG. 7 is a schematic representation of a storage array having a data server according to an example embodiment of the invention.

FIG. 7 shows an example system 700 that can provide a storage array with solid state drive (SSD) storage 702 with at least one embedded data server 704a,b that can perform IO operations on array storage exposed to remote data clients. In embodiments, the data server 704 can correspond to data server 314 of FIG. 3A and the storage 702 can correspond to the storage 316 of FIG. 3A. In embodiments, the data storage system 700 can distribute data blocks in storage devices 702a-N by generating a unique identifier for each data block based on the content of the data block. For example, a hash value can be generated from the data in the data block to provide the unique identifier.

In embodiments, the data storage system 700 may include first and second storage controllers 706a,b that can include respective processing platforms 708a,b with processing and memory resources. One or more interconnect systems 710 can provide access to the storage 702. In embodiments, storage 702 can be provided as solid state drives (SSDs) 702a-N, which can be FLASH based, for example.

It is understood that any practical number of storage devices, storage controllers, processors, ports, interconnect components and the like can be used to meet the needs of a particular application. For example, a single storage controller can be used.

In embodiments, the storage devices 702 can be provided in a disk array enclosure (DAE) 703, and the storage controllers 706a,b can be provided on a cluster that may 'own' an attached disk array enclosure (DAE). Regardless of which storage controller 706a,b receives an I/O request from a host 712, which can include a data client (see, e.g., 304 FIG. 3A) the storage controllers 706a,b may cooperate to process the request. In embodiments, the system may ensure that components share the load and participate generally evenly in I/O operations.

In embodiments, the data storage system 700 may deduplicate data as the system processes the data in blocks of 4K, 8K or other desired size. The system 700 may include a global memory cache, which is aware of the deduplicated data, and content-based distribution that spreads the data evenly across the entire array. In embodiments, the first storage controller 706a may include first cache memory 714a and the second storage controller 706b may include second cache memory 714b that may both contribute to the global cache.

Figure 8:
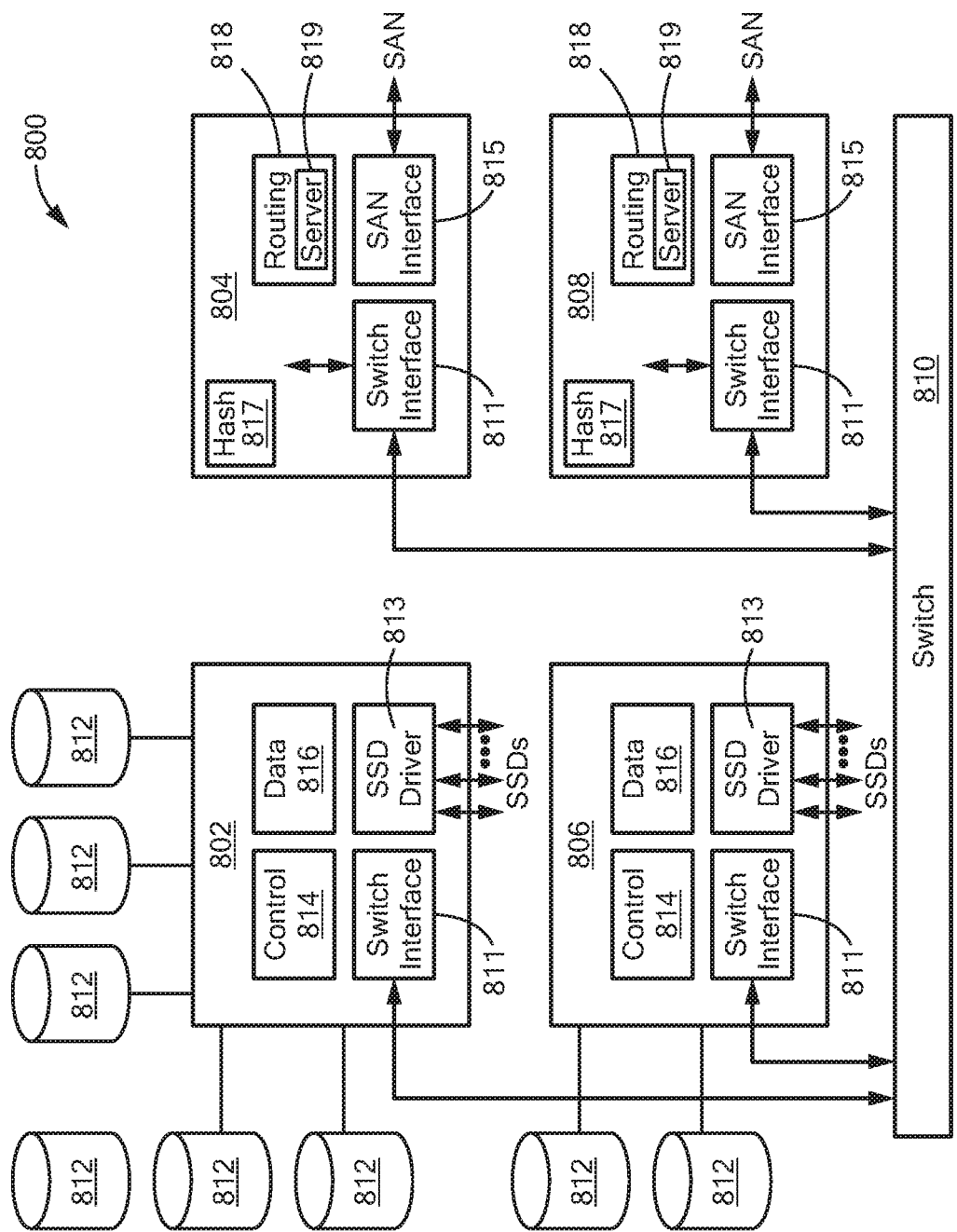
FIG. 8 is a schematic representation of a storage array having nodes and a data server according to an example embodiment of the invention.

FIG. 8 shows an illustrative node-based data storage system 800. In embodiments, a node can include one or more systems of the same or different types to meet the needs of a particular application. Illustrative nodes can include routing systems, control systems, data systems, and/or hash systems.

In the illustrated embodiment, first, second, third, and fourth nodes 802, 804, 806, 808 can be interconnected by a switch 810 via a switch interface 811. The first node 802 can include a control system 814 and a data system 816. In embodiments, separate data and control planes may be provided by the control and data systems 814, 816. The control system 814 may control execution of read and write commands to the storage devices 812. The data systems 816 may be connected to the storage devices 812 and, under control of a respective control system 814, may pass data to and/or from the storage devices via suitable storage drivers 813.

The data and/or control systems 814, 816 may retain extracts, e.g., a hash, of the data stored in the storage devices 812. In embodiments, the data extracts may be generated by cryptographic hashing of the data. In embodiments, the extracts may be used for content addressing of the data blocks to the physical storage devices 812.

The second node 804 can include a hash system 817 to generate the hash/extract for the data blocks, which can be referred to as a content fingerprint. The second node 804 can also include a routing system 818, along with a switch interface 811 and a SAN interface 815. The routing system 818 may terminate storage and retrieval operations and distribute command parts of any operations to control systems 814 that are explicitly selected for the operation in such a way as to retain balanced usage within the system.

In an embodiment, the routing system 818 can include an embedded data server 819 that can perform IO operations requested by a remote data client, for example. An example data server 819 is described more fully below. In the illustrated embodiment, the third node 806 can be similar to the first node 802 and the fourth node 808 can be similar to the second node 804 and will not be discussed further.

The routing systems 818 may use the hash values, calculated from data blocks to select control systems 814 for distribution. More particularly, selection of the control system 814 may use hash values, or may rely on the user address and not on the content (hash). The hash value may, however, be used for selecting the data system 816, and for setting the physical location for data storage within the data system.

In some examples, the system 800 may employ more than a single type of memory technology, including a mix of more than one Flash technology (e.g., single level cell—SLC flash and multilevel cell—MLC flash), and a mix of Flash and DRAM technologies. In certain embodiments, the data mapping may optimize performance and life span by taking advantage of the different access speeds and different write/erase cycle limitations of the various memory technologies.

Figure 8A:
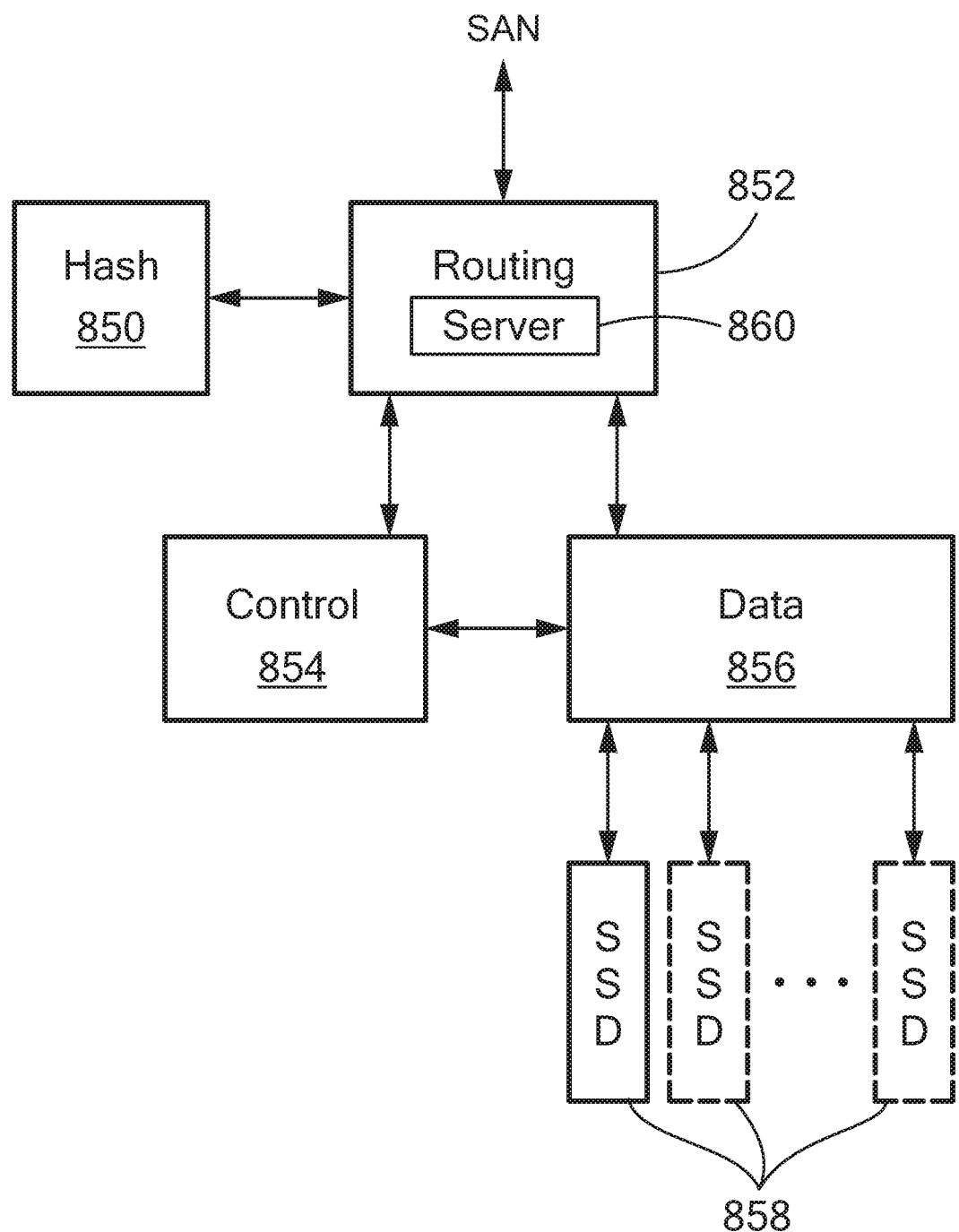
FIG. 8A is schematic representation of nodes that can form part of a storage array with a data server according to an example embodiment of the invention.

FIG. 8A is an example of a system that can include a hash system 850 connected to a routing system 852, which can be coupled to a control system 854 and a data system 856. The data system 856 can be connected to any practical number of memory devices 858. The routing system 852 can route read/write commands from a host to an appropriate control and data system 854, 856 for execution. In embodiments, the data content-based mapping to physical storage 858 can distribute workload relatively evenly and provide separation of the control and data paths. In an embodiment, the routing system 852 can include a data server 860 to facilitate IO operations to storage 858 as requested by a data client on a remote host running an application, for example.

Figure 9:
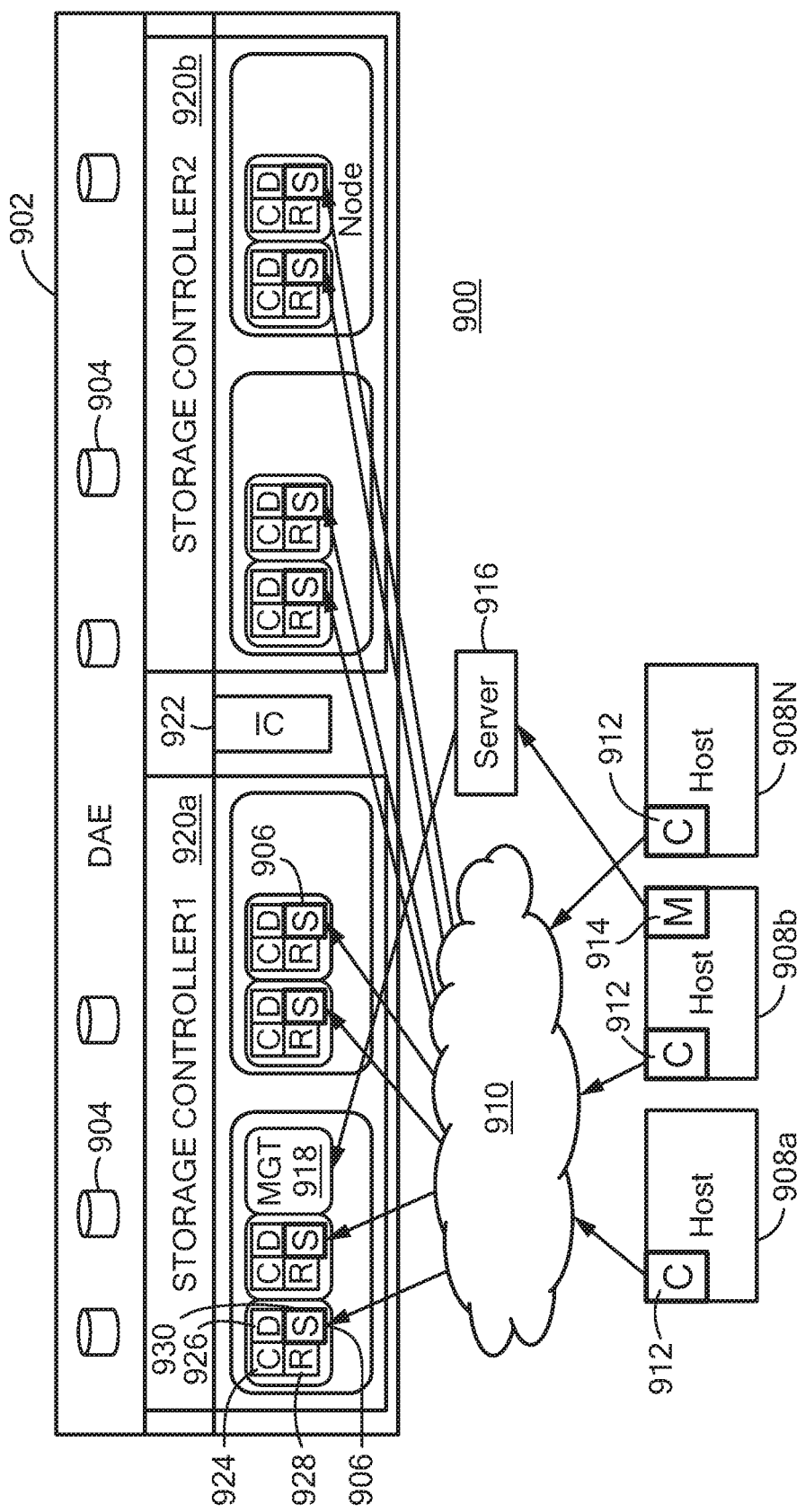
FIG. 9 is a schematic representation of a storage array having solid state storage and a data server to communicate with remote hosts having data clients according to an example embodiment of the invention.

FIG. 9 shows an example data storage system 900 that can include a storage array 902 having solid state drive (SSD) storage 904 and at least one data server 906 that may be coupled to various hosts 908a-N via a network 910. The storage 904 may form part of a disk array enclosure (DAE). The hosts 908 can include a data client 912 that can request IO operations to be performed by the data server 906. One of the hosts 908b can include a metadata manager 914 that may enable nodes to know which nodes may need to communicate. The metadata manager 914 can store mapping and storage ownership information and enable remapping of storage and storage migration, for example. The metadata manager 914 can be coupled to a management system 918 of the storage array 902 via a server 916, which may be provided as a management server. In embodiments, the management system 918 may be responsible for system wide configurations including, for example, communicating with the management server 916 to perform actions such as volume creation, host LUN masking, etc.

The storage array 902 can include first and second storage controllers 920*a,b* that can communicate via an interconnect 922. The storage controllers 902 may include nodes, each of which may include one or more of a control system 924, a data system 926, a routing system 928, which can include hash functionality, and a data server 906, which can be embedded in the routing system 928. Each of the nodes can include a control system 924, a data system 926, a routing system 928, and/or a data server 906.

In embodiments, a system can non disruptively move volumes from one solid state cluster to another solid state cluster by temporarily establishing mirroring between solid state clusters by copying the data and than de-committing the moved LUN's space.

Figure 9A:
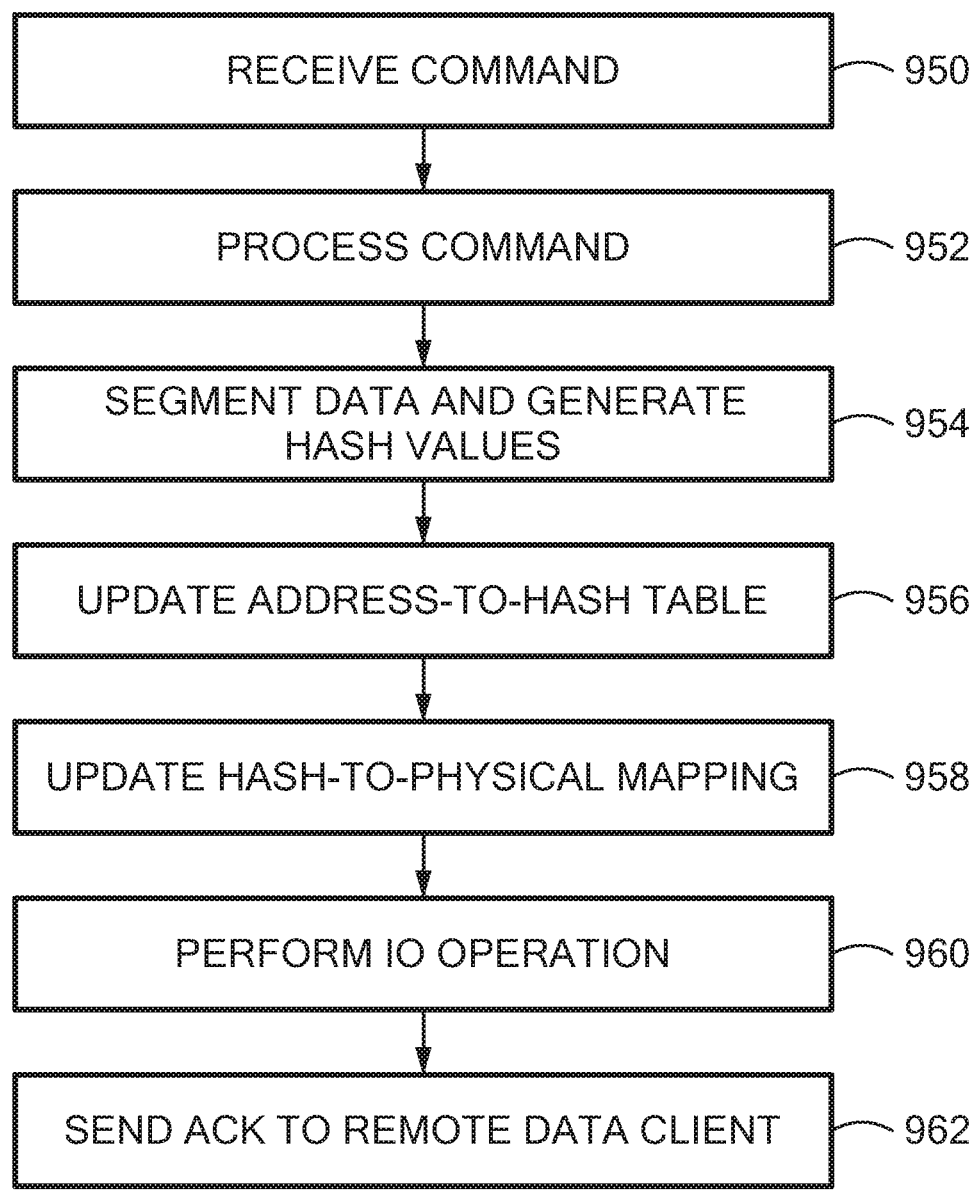
FIG. 9A is a flow diagram of a process for a storage array having solid state storage and a data server to communicate with remote hosts having data clients according to an example embodiment of the invention.

FIG. 9A shows an example process for a storage array having solid state storage and a data server to communicate with remote hosts having data clients according to an example embodiment of the invention. In step 950, a command, e.g. a read or write command, from a remote host is received at a storage array having solid state drive (SSD) storage. The remote host can be running a data client and an application which can generate a read or write command, for example. In step 952, a routing system and/or data server on the storage array can process the received command. In step 954, the routing system scan segment the data in the data stream for the command and generate a hash for the data blocks. In step 956, a control system of the storage array may update an address to hash mapping table (A2H). In step 958, a data system of the storage array may update a hash to physical (H2P) SSD address mapping. In step 960, the data system may perform IO operations to the SSDs. In step 962, the data server of the storage array may send an acknowledgement to the remote data client. In embodiments, the storage array provides a portion of the SSD storage to a distributed storage system having hosts that provide storage for storage pools.

Figure 10:
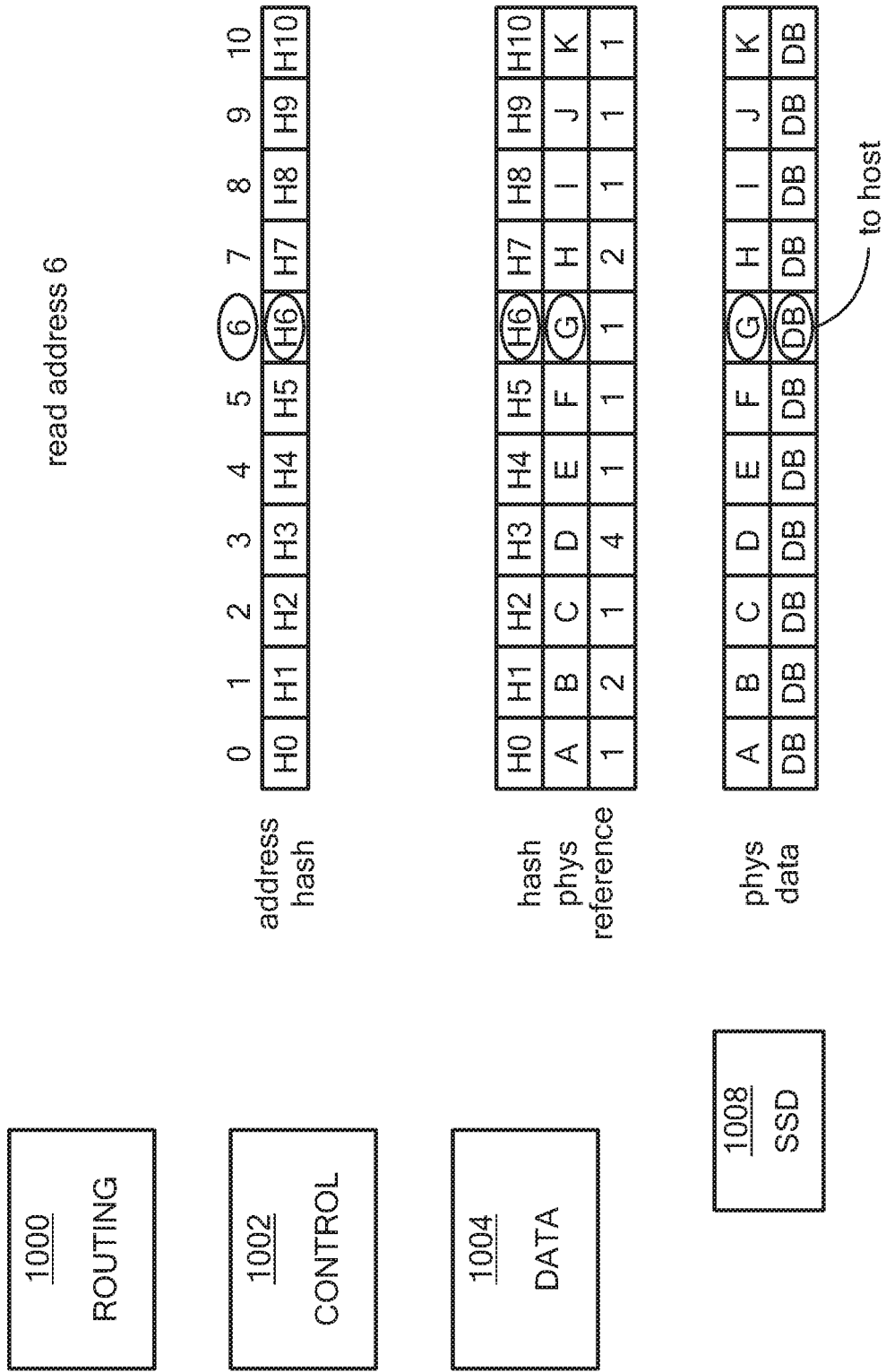
FIG. 10 is a diagrammatic representation of an example read operation for a storage array according to an example embodiment of the invention.

FIG. 10 shows an illustrative read operation for the storage array 902 of FIG. 9 in accordance with embodiments of the disclosure. As described above, a routing system 1000 may parse host commands parser and translate host SCSI commands, for example into internal commands/addresses. In general, the routing system 1000 may provide an ingress/egress point for node IOs and may segment a data stream into data blocks. The routing system 1000 may include a hash system to generate hash values for the data blocks.

In the illustrated example, a read command to read address 6 is received. The routing system 1000 may select a control system 1002 to handle the read operation. As described above, the control system 1002 may contain the address to a hash mapping table (A2H). As described above, the data system 1004 may contain a hash to physical (H2P) SSD address mapping, which may be used to perform IO operations to the SSDs 1008. The data system 1004 may manage data protection functionality to prevent data loss.

For the illustrated example, a host may issue a read command for a logical block address, which is shown as address "6," via a Fibre Channel or iSCSI port, for example. The routing system 1000 receives the command and determines a requested address range into data blocks of 4K, for example and passes the address information to the control system 1002. The control system 1002 looks up address 6 to obtain the hash value, which is shown as H6. The H6 hash value is passed to the data system 1004 which can perform a look up of the H6 hash value in a hash-to-physical address table to read the physical address for the data. In the example, the physical address is shown as "G." The data system 1004 can use the physical address to read the data block (DB) at physical address Gin the SSD 1008. A reference count can correspond to a number of times the hash value is referenced in physical storage 1008.

For a write operation from a host, the routing system 1000 can receive the data and command segment the data stream into data blocks, and generate hash value for the data blocks. The hash value can be provided to the control system 1002 to determine if the write data is unique. If unique, the hash value is placed in an address mapping. The control system 1002 may pass the hash value to the data system 1004 which can assign the hash value to a physical address and write the data block(s) to the SSD at the physical address.

If the hash value generated by the routing system 1000 is not unique, the control system 1002 can determine that data already exists at the physical address for the hash value. Since the data already exists, the data system 1004 can increment the reference count for the data block. The data may not be written to the SSD 1008. Deduplication may refer to a situation where a hash for a data block is found not to be unique and not written to physical storage. The reference count for the non-unique hash/data block may be incremented.

Figure 11:
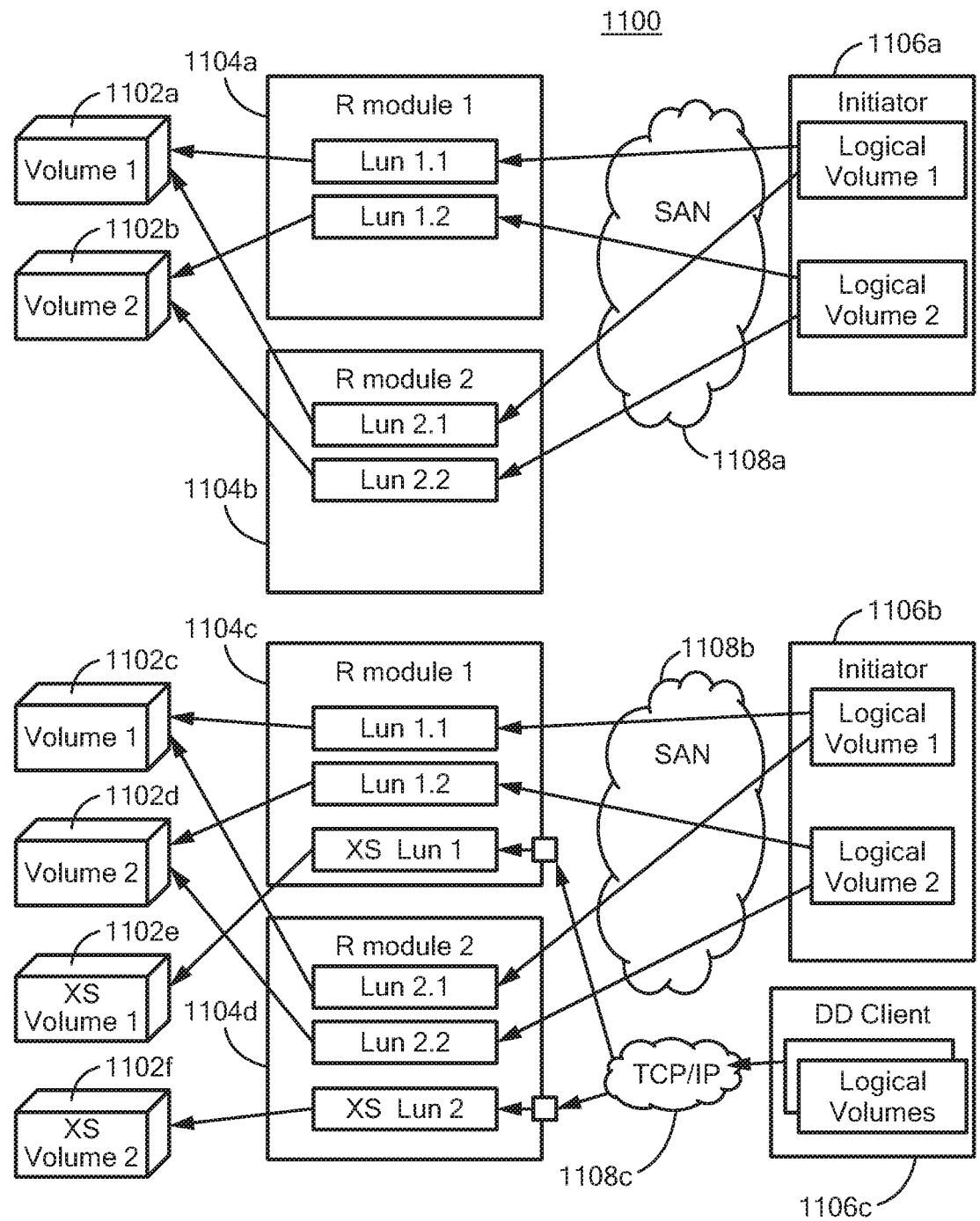
FIG. 11 is a schematic representation of portions of a storage array having solid state storage and a data client according to an example embodiment of the invention.

FIG. 11 shows an example system 1100 having a series of volumes 1102*a-f* in communication with a series of routing modules 1104*a-d*, which may be coupled to various initiators 1106*a-c*, each having local logical volumes, via a SAN 1108*a,b*, and/or network, such as TCP/IP 1108*c*. As described above, one or more of the routing modules 1104*a,b,c* can receive commands from an initiator 1106, such as a SCSI frontend (e.g., a SCST—an open source module). Initiator 1106*c* can comprise a distributed data client module, such as data client 912 of FIG. 9. In embodiments, each LUN may point to one logical volume, but a logical volume may be referenced.

Figure 12A:
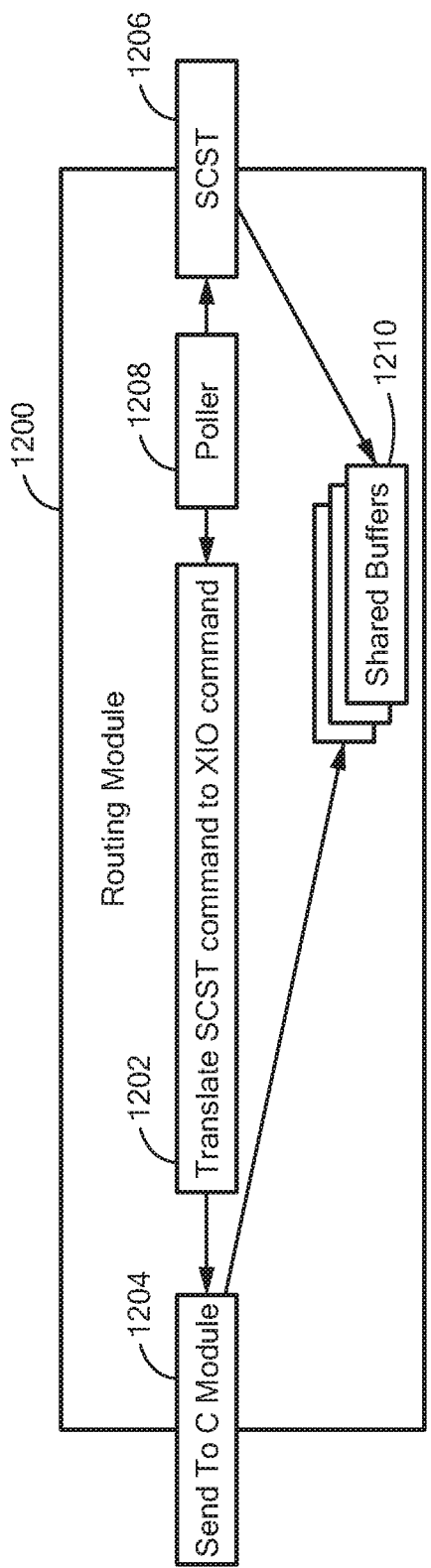
FIGS. 12A, B, C are representations of distributed data server, storage array routing module, and a storage array in communication with distributed data clients in accordance with embodiments of the invention.

As shown in FIG. 12A, a routing module 1200 may translate a SCSI format command 1202, which may contain LUN (logical unit) information, and logical block address (LBA) information, into a command to access a specific logical volume at particular offset, as described above. A thread for the command, e.g. an XIO command, may determine which control module 1204 (e.g., control module 814 in FIG. 8) may be responsible to execute the command and translate the command into a datagram packet, for example, for transmission over an interconnect to the appropriate control module. In order to minimize handling latency, instead of waiting for notification from a SCST module 1206 regarding arriving SCSI commands, the routing module 1200 may create a number of threads that poll 1208 the SCST module 1206 to identify new SCSI commands. In embodiments, the SCST module 1206 and the routing module 1200 may share a set of buffers 1210. When the SCST module 1206 receives data, the data may be directed memory accessed to these buffers 1210 and become accessible to the routing module without copying.

Figure 12B:
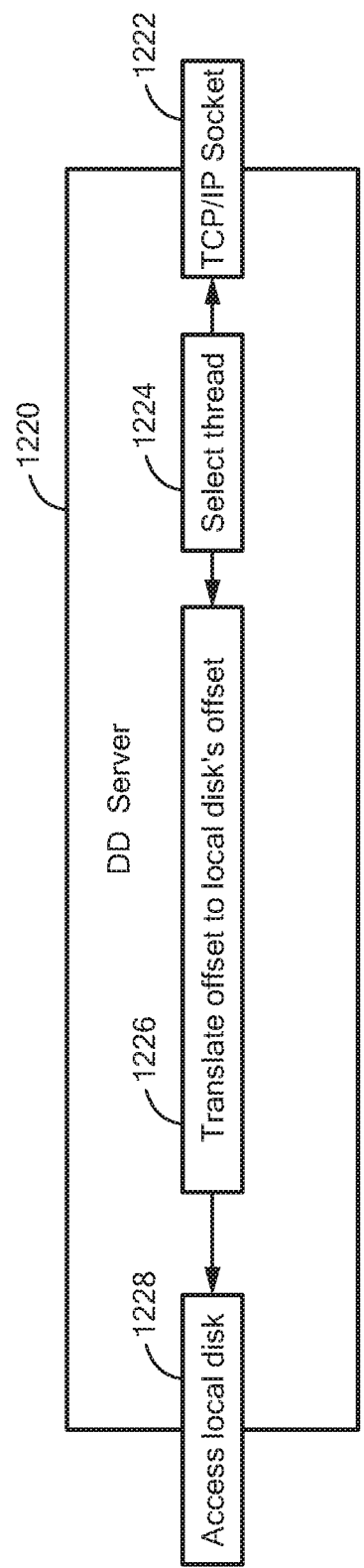

As shown in FIG. 12B, a distributed data server 1220 may receive a command 1222 via a socket, such as a TCP/IP socket, and select a thread 1224. For a read/write operation, the data server may translate an offset to the local disk offset 1226 and access the disk 1228. Distributed data server 1220 may be similar to the distributed data server 314 in FIG. 3A and/or 906 in FIG. 9.

As described above, distributed data server 1220 may have a relatively small footprint in the system. In embodiments, a thread, such as one thread, waits for notification of new data on a TCP/IP socket 1222, for example. When a new command is available on the socket, a command is read on a single buffer, for example. In embodiments, the command has a specific format. The distributed data server 1220 then parses the command, which contains an instruction to read or write data to/from a specified local disk to/from a specified offset on that local disk 1226. The data server 1220 then performs the command as requested to access the local disk 1228.

Figure 12C:
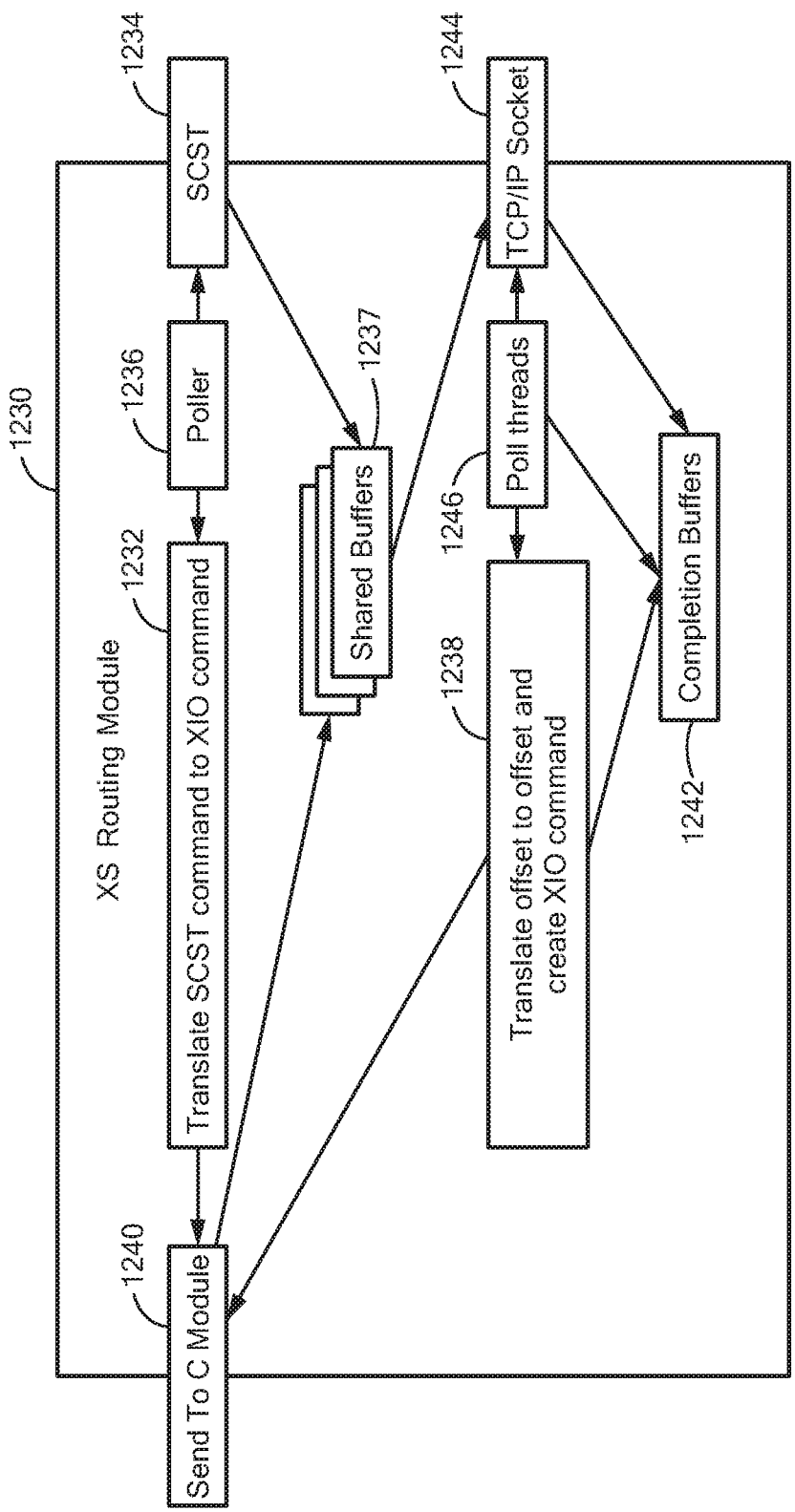

FIG. 12C shows a XS routing module 1230 that may process commands as a distributed data server 1220 (FIG. 12B) and a routing module 1200 (FIG. 12A) in addition to routing module functionality described above. The XS routing module 1230 includes a module 1232 to translate a SCST command to a XIO command from a SCST module 1234 and poller 1236. Shared buffers 1237 can store data associate with the commands. The XS routing module 1230 can also include a module 1238 to translate distributed data offsets to a SSD storage system offset for creating a XIO command that can be sent to a control module 1240. A completion buffer 1242 can be used for command completion information, as described more fully below. Commands can be received via a TCP/IP docket 1244 and poll threads 1246.

In addition to the existing logical volumes and luns, each XS routing module 1230 may have access to a private logical volume, such as XS volume 1102e in FIG. 11, available only to that particular XS routing module 1230. The private logical volume 1102e may be mapped to a single XS lun in its routing module 1104c for providing a XS Lun to XS volume a one-to-one relationship. Distributed data clients, such as DD client 1106c (FIG. 11) may have access only to the private LUN (e.g., XS lun 1), which can be kept private by not reporting its existence to other SAN initiators 1106a,b, for example. The private LUN enables the distributed data client 1106c reads and writes on the private LUN without regard to other users, so that the LUN should be separate from the LUNs available to other users/initiators.

In embodiments, because both logical volumes such as 1102a-d and XS volumes 1102e are managed by the control and data modules (e.g., 924, 926 FIG. 9) without regard to differences between them, the XS volumes 1102e,f can include deduplication and compression, for example.

In embodiments, in order to maintain low latency, the XS routing module 1230 may not wait for new data to become available on the TCP/IP socket 1244, but rather may create threads 1246 that may poll the TCP/IP socket for new data. Because this may mean that not all required data is available on the first successful poll operation, in embodiments the XS routing module 1230 may keep partial command data in a buffer until data for that command is read into that buffer. In order to avoid spurious copying, that buffer may be one of the buffers 1237 shared between SCST and the routing module and available to the control and data module for direct access.

After the data for a command was read, the received command may be translated to a read/write command from private XS logical volume. A new thread may be created to handle the command. The thread may including routing by the routing module.

In embodiments, where command handling is done asynchronously, a mechanism can notify completion of commands to the client through the TCP/IP socket 1244. In embodiments, the system can have a completion buffer 1242 per TCP socket. Whenever a command is completed, the routing module 1230 may write to the buffer the response that the module would have sent through the socket. The poller threads 1246 can poll that buffer periodically and when there is a response available it will as much as possible to the TCP/IP socket 1244 and keep the rest for the next round of polling.

Figure 13:
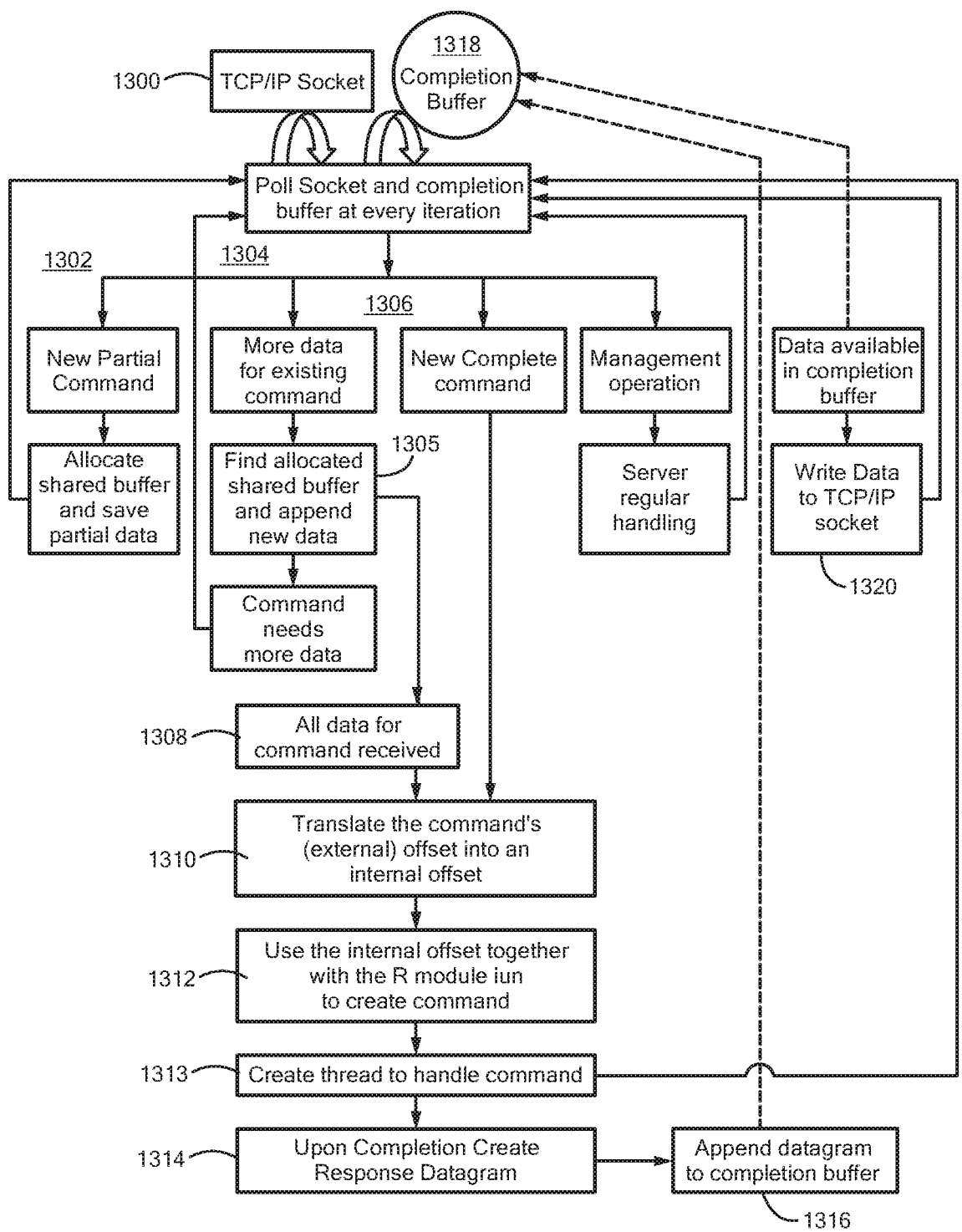
FIG. 13 is a flow diagram showing illustrative processing for a storage array in communication with distributed data clients in accordance with embodiments of the invention.

FIG. 13 shows an example flow diagram. In embodiments, when an initiator, such as a distributed data client sends a command to a SSD storage array, a poller threads poll a TCP/IP socket 1300. Whenever there is data available 1302, 1304, 1306, the data is accumulated in a shared buffer until the data that describes the command is read 1308. For example, there can be a partial command 1302 where shared buffer is allocated and data saved 1303. Additional data for an existing command can be received 1304 for which the allocated shared buffer can be located. Or a command can be complete 1306. The data is then translated/parsed 1310 and the distributed data client understands which offset on the private lun on that the routing module the client wishes to access. In embodiments, the system translates a command's external offset into an internal offset. A command in the storage array format is created 1312 to access the private logical volume on a corresponding storage array offset and a new thread is created 1313 to handle that command. For a storage array command, the routing module may handle the command. Once the command is completed by the SSD storage array, the distributed data server creates a datagram 1314 with the appropriate response and appends that datagram 1316 to the completion buffer 1318 of the requesting socket to terminate the thread. On the next polling iteration, the poller notices that data is available in the completion buffer and writes that data to the TCP/IP socket 1320 in non-blocking mode.

Figure 14:
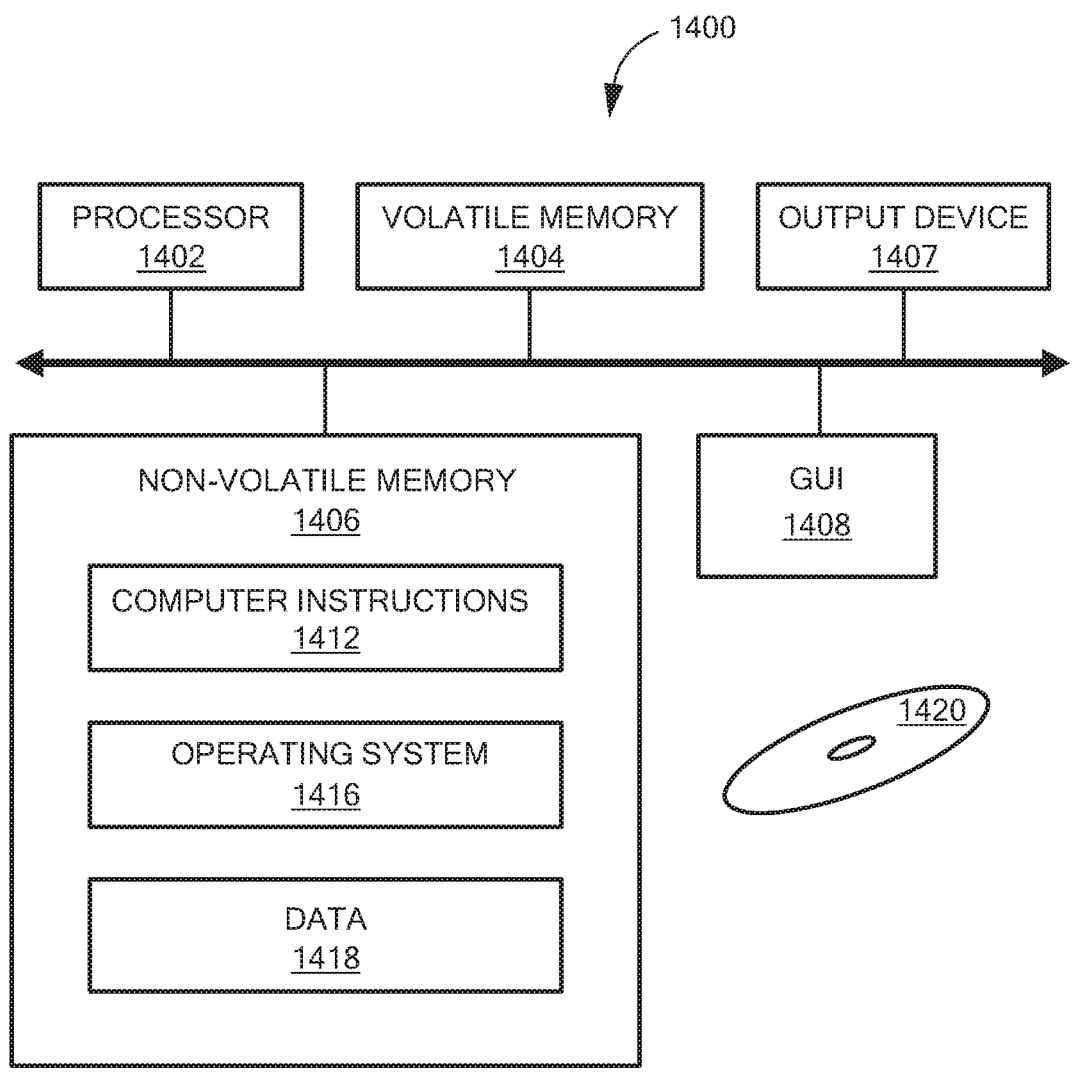
FIG. 14 is a schematic representation of an illustrative computer that can perform at least a portion of the processing described herein.

FIG. 14 shows an exemplary computer 1400 that can perform at least part of the processing described herein. The computer 1400 includes a processor 1402, a volatile memory 1404, a non-volatile memory 1406 (e.g., hard disk), an output device 1407 and a graphical user interface (GUI) 1408 (e.g., a mouse, a keyboard, a display, for example). The non-volatile memory 1406 stores computer instructions 1412, an operating system 1416 and data 1418. In one example, the computer instructions 1412 are executed by the processor 1402 out of volatile memory 1404. In one embodiment, an article 1420 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used.

The embodiments contained herein should not be limited to disclosed embodiments but rather should be limited only by the spirit and scope of the appended claims.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

All publications and references cited herein are expressly incorporated herein by reference in their entirety.

What is claimed is:

1. A system, comprising:
   a storage array comprising:
      solid state drive (SSD) storage;
      a controller coupled to the SSD storage, the controller comprising:
         a control system configured to:
            control a mapping table of an address to a corresponding hash value;
         a routing system coupled to the control system configured to receive a read command from a remote host by: instantiating a first thread that is configured to poll a TCP/IP socket and store any partial data associated with the read command in a buffer until the entire read command is stored into the buffer, and instantiating a second thread that is configured to execute the read command after the entire read command has been stored into the buffer;
         a data system coupled to the control system configured to:
            perform input/output operations to the SSD storage based upon at least one of physical addresses of data blocks and hash values of the data blocks; and
         a data server associated with the routing system configured to:
            receive the read and write commands from a data client running on the remote host,
      wherein the storage array contributes a portion of the SSD storage to storage pools of a distributed elastic storage system,
      wherein at least one logical volume of the storage pools is maintained as private such that the logical volume is available only to a corresponding remote host via a corresponding routing system.

2. The system according to claim 1, wherein the data server is embedded in the routing system.

3. The system according to claim 1, Wherein the storage array is configured to perform data deduplication.

4. The system according to claim 1, further including establishing mirroring of storage volumes formed from the SSD storage of the storage array with storage volumes of a further storage array having SSD storage, terminating the mirroring, and decommitting space for the mirrored storage volumes on the storage array.

5. The system according to claim 1, wherein the controller further includes a management system to communicate with a metadata manager on the remote host.

6. The system according to claim 1, wherein the distributed elastic storage system includes storage data clients and storage data servers.

7. A method, comprising:
   coupling a control system to a data system to control a mapping table of an address to a corresponding hash value;
   coupling a routing system to the control system to identify and process a new read command from a remote host by: instantiating a first thread that is configured to poll a TCP/IP socket and store any partial data associated with the read command in a buffer until the entire read command is stored into the buffer, and instantiating a second thread that is configured to execute the read command after the entire read command has been stored into the buffer;
   coupling a controller to solid state drive (SSD) storage of a storage array, wherein the controller includes a data system to perform input/output operations to the SSD storage based upon at least one of physical addresses of data blocks and hash values of the data blocks; and
   associating a data server with the routing system to receive the read and write commands from a data client running on the remote host,
   wherein the storage array contributes a portion of the SSD storage to storage pools of a distributed elastic storage system,
   wherein at least one logical volume of the storage pools is maintained as private such that the logical volume is available only to a corresponding remote host via a corresponding routing system.

8. The method according to claim 7, further including embedded the data server in the routing system.

9. The method according to claim 7, further including configuring the storage array to perform data deduplication.

10. The method according to claim 7, further including establishing mirroring of storage volumes formed from the SSD storage of the storage array with storage volumes of a further storage array having SSD storage, terminating the mirroring, and decommitting space for the mirrored storage volumes on the storage array.

11. The method according to claim 7, further including using a management system to communicate with a metadata manager on the remote host.

12. The method according to claim 7, wherein the distributed elastic storage system includes storage data clients and storage data servers.

13. An article, comprising:
   a non-transitory computer readable medium baying stored instructions that enable a machine to:
   control a controller coupled to solid state drive (SSD) storage of a storage array;

communicate with a control system to control a mapping table of an address to a corresponding hash value;

communicate with a routing system coupled to the control system to identify a read command from a remote host by: instantiating a first thread that is configured to poll a TCP/IP socket and store any partial data associated with the read command in a buffer until the entire read command is stored into the buffer, and instantiating a second thread that is configured to execute the read command after the entire read command has been stored into the buffer;

control a controller coupled to solid state drive (SSD) storage of a storage array, wherein the controller includes a data system to perform input/output operations to the SSD storage based upon at least one of physical addresses of data blocks and hash values of the data blocks; and associate a data server with the routing system to receive the read and write commands from a data client running on the remote host, wherein the storage array contributes a portion of the SSD storage to storage pools of a distributed elastic storage system, wherein at least one logical volume of the storage pools is maintained as private such that the logical volume is available only to a corresponding data client via a corresponding routing system.

14. The article according to claim 13, further including instructions to embed the data server in the routing system.

15. The article according to claim 13, further including instructions to configure the storage array to perform data deduplication.

16. The article according to claim 13, further including instructions to establish mirroring of storage volumes formed from the SSD storage of the storage array with storage volumes of a further storage array having SSD storage, terminating the mirroring, and decommitting space for the mirrored storage volumes on the storage array.

17. The article according to claim 13, further including instructions for a management system to communicate with a metadata manager on the remote host.

* * * * *